United States Patent
Lu et al.

(10) Patent No.: US 11,463,876 B2
(45) Date of Patent: Oct. 4, 2022

(54) PHYSICAL VERIFICATION AND AUTHORIZATION FOR WIRELESS CONTROL OF A NETWORK

(71) Applicant: ABL IP HOLDING LLC, Conyers, GA (US)

(72) Inventors: Yenpao Albert Lu, Cumming, GA (US); Marc Saes, Eindhoven (NL); Mitri J. Abou-Rizk, Newton, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 202 days.

(21) Appl. No.: 17/022,743

(22) Filed: Sep. 16, 2020

(65) Prior Publication Data
US 2022/0086639 A1 Mar. 17, 2022

(51) Int. Cl.
| | |
|---|---|
| *H04W 12/08* | (2021.01) |
| *H04B 10/516* | (2013.01) |
| *H04L 9/40* | (2022.01) |
| *H04W 12/06* | (2021.01) |
| *H04B 10/116* | (2013.01) |
| *H04W 84/12* | (2009.01) |

(52) U.S. Cl.
CPC .......... *H04W 12/08* (2013.01); *H04B 10/116* (2013.01); *H04B 10/516* (2013.01); *H04L 63/083* (2013.01); *H04W 12/06* (2013.01); *H04W 84/12* (2013.01)

(58) Field of Classification Search
CPC ..... H04W 12/02; H04W 12/06; H04W 12/08; H04L 63/083
See application file for complete search history.

(56) References Cited

U.S. PATENT DOCUMENTS

| | | | |
|---|---|---|---|
| 9,287,976 B2 | 3/2016 | Ganick et al. | |
| 10,250,948 B1* | 4/2019 | Bortz | H04B 10/60 |
| 10,318,854 B2* | 6/2019 | Davis | H04L 63/10 |
| 2009/0150356 A1* | 6/2009 | Walker | H04L 12/2809 |
| | | | 709/224 |

(Continued)

OTHER PUBLICATIONS

H. Yang, W. -D. Zhong, C. Chen and A. Alphones, "Integration of Visible Light Communication and Positioning within 5G Networks for Internet of Things," in IEEE Network, vol. 34, No. 5, pp. 134-140, Sep./Oct. 2020. (Year: 2020).*

(Continued)

*Primary Examiner* — Kari L Schmidt
(74) *Attorney, Agent, or Firm* — RatnerPrestia

(57) ABSTRACT

A mobile device logs in to an authorization server, via a mobile device network communication interface, over a secondary network. The mobile device receives, via an image sensor, over a light communication band, a respective verification code. In response to logging in to the authorization server and receiving the respective verification code, the mobile device transmits, via the mobile device network communication interface over the secondary network, the respective verification code to the authorization server. In response to transmitting the respective verification code to the authorization server, the mobile device obtains, via the mobile device network communication interface over the secondary network, an authentication approval to control a plurality of RF nodes over a local wireless communication network.

20 Claims, 14 Drawing Sheets

(56) References Cited

U.S. PATENT DOCUMENTS

| | | | |
|---|---|---|---|
| 2014/0250498 A1* | 9/2014 | Yamasaki | H05B 47/195 726/4 |
| 2014/0255036 A1* | 9/2014 | Jovicic | G07C 9/00309 398/115 |
| 2014/0317005 A1* | 10/2014 | Balwani | G06Q 10/0832 705/317 |
| 2015/0044969 A1* | 2/2015 | Tucker | H04B 13/005 455/41.2 |
| 2015/0147067 A1* | 5/2015 | Ryan | H04L 67/12 398/118 |
| 2016/0140405 A1* | 5/2016 | Graumann | G06V 40/40 382/118 |
| 2016/0254864 A1* | 9/2016 | Mueller | H04L 63/08 398/118 |
| 2017/0017815 A1* | 1/2017 | Caso | G06F 21/35 |
| 2017/0154508 A1* | 6/2017 | Grant | G08B 21/0272 |
| 2018/0018473 A1* | 1/2018 | Knibbe | H04W 12/64 |
| 2018/0196972 A1* | 7/2018 | Lu | G06K 7/1091 |
| 2018/0367988 A1* | 12/2018 | Kumar | H04W 12/033 |
| 2019/0172287 A1* | 6/2019 | Kaye | G07C 9/00309 |
| 2021/0192028 A1* | 6/2021 | Tokuchi | G06F 3/017 |
| 2021/0303851 A1* | 9/2021 | Dodson | G06V 40/172 |

OTHER PUBLICATIONS

A. Aldalbahi, M. Rahaim, A. Khreishah, M. Ayyash and T. D. C. Little, "Visible Light Communication Module: An Open Source Extension to the ns3 Network Simulator With Real System Validation," in IEEE Access, vol. 5, pp. 22144-22158, 2017. (Year: 2017).*

X. Zhao and J. Sun, "Physical-Layer Security for Mobile Users in NOMA-Enabled Visible Light Communication Networks," in IEEE Access, vol. 8, pp. 205411-205423, 2020. (Year: 2020).*

Prakash Shrestha and Nitesh Saxena. 2017. An Offensive and Defensive Exposition of Wearable Computing. ACM Comput. Surv. 50, 6, Article 92 (Nov. 2018), 39 pages (Year: 2018).*

* cited by examiner

FIG. 1C

Luminaire Node Map 125

Luminaire Settings 126A-T

| Luminaire Position | Luminaire Identifier 128A-T | Verification Code 129A-T | Set of Location Coordinates 127A-T | |
|---|---|---|---|---|
| | | | X Location Coordinate | Y Location Coordinate |
| 1 | 110A | 118A | 1 | 1 |
| 2 | 110B | 118B | 2 | 1 |
| 3 | 110C | 118C | 3 | 1 |
| 4 | 110D | 118D | 4 | 1 |
| 5 | 110E | 118E | 5 | 1 |
| 6 | 110F | 118F | 6 | 1 |
| 7 | 110G | 118G | 1 | 2 |
| 8 | 110H | 118H | 2 | 2 |
| 9 | 110I | 118I | 3 | 2 |
| 10 | 110J | 118J | 4 | 2 |
| 11 | 110K | 118K | 5 | 2 |
| 12 | 110L | 118L | 6 | 2 |
| 13 | 110M | 118M | 1 | 3 |
| 14 | 110N | 118N | 2 | 3 |
| 15 | 110O | 118O | 3 | 3 |
| 16 | 110P | 118P | 4 | 3 |
| 17 | 110Q | 118Q | 5 | 3 |
| 18 | 110R | 118R | 1 | 4 |
| 19 | 110S | 118S | 2 | 4 |
| 20 | 110T | 118T | 3 | 4 |

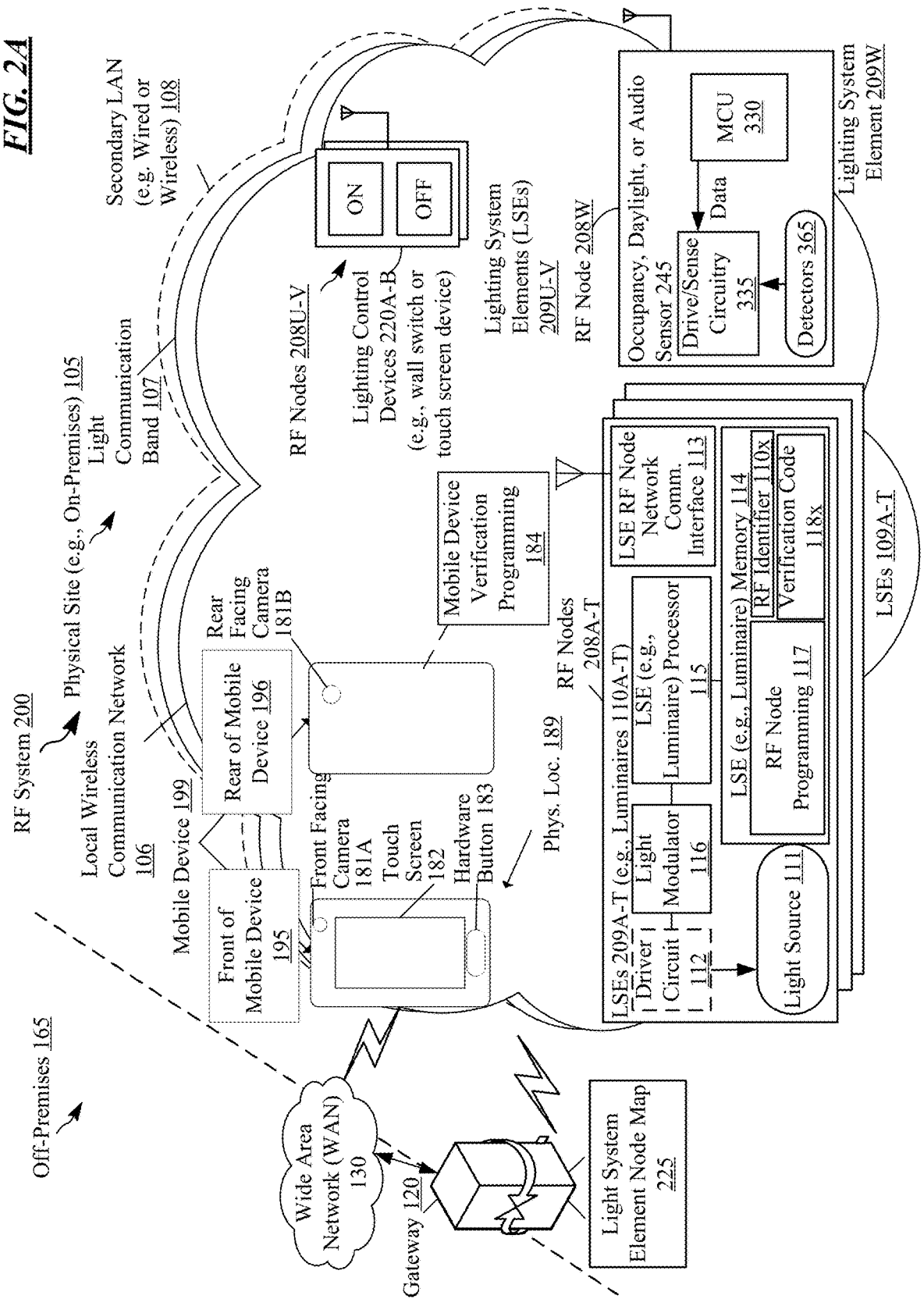

Lighting System Element Node Map 225

LSE Settings 226A-W

| Lighting System Element Position | Lighting System Element Identifier 228A-W | Verification Code 229 A-W | Set of Location Coordinates 127A-W | |
|---|---|---|---|---|
| | | | X Location Coordinate | Y Location Coordinate |
| 1 | 209A | 111A | 1 | 1 |
| 2 | 209B | 111B | 2 | 1 |
| 3 | 209C | 111C | 3 | 1 |
| 4 | 209D | 111D | 4 | 1 |
| 5 | 209E | 111E | 5 | 1 |
| 6 | 209F | 111F | 6 | 1 |
| 7 | 209G | 111G | 1 | 2 |
| 8 | 209H | 111H | 2 | 2 |
| 9 | 209I | 111I | 3 | 2 |
| 10 | 209J | 111J | 4 | 2 |
| 11 | 209K | 111K | 5 | 2 |
| 12 | 209L | 111L | 6 | 2 |
| 13 | 209M | 111M | 1 | 3 |
| 14 | 209N | 111N | 2 | 3 |
| 15 | 209O | 111O | 3 | 3 |
| 16 | 209P | 111P | 4 | 3 |
| 17 | 209Q | 111Q | 5 | 3 |
| 18 | 209R | 111R | 1 | 4 |
| 19 | 209S | 111S | 2 | 4 |
| 20 | 209T | 111T | 3 | 4 |
| 21 | 209U | 111U | 4 | 4 |
| 22 | 209V | 111V | 5 | 4 |
| 23 | 209W | 111W | 6 | 4 |

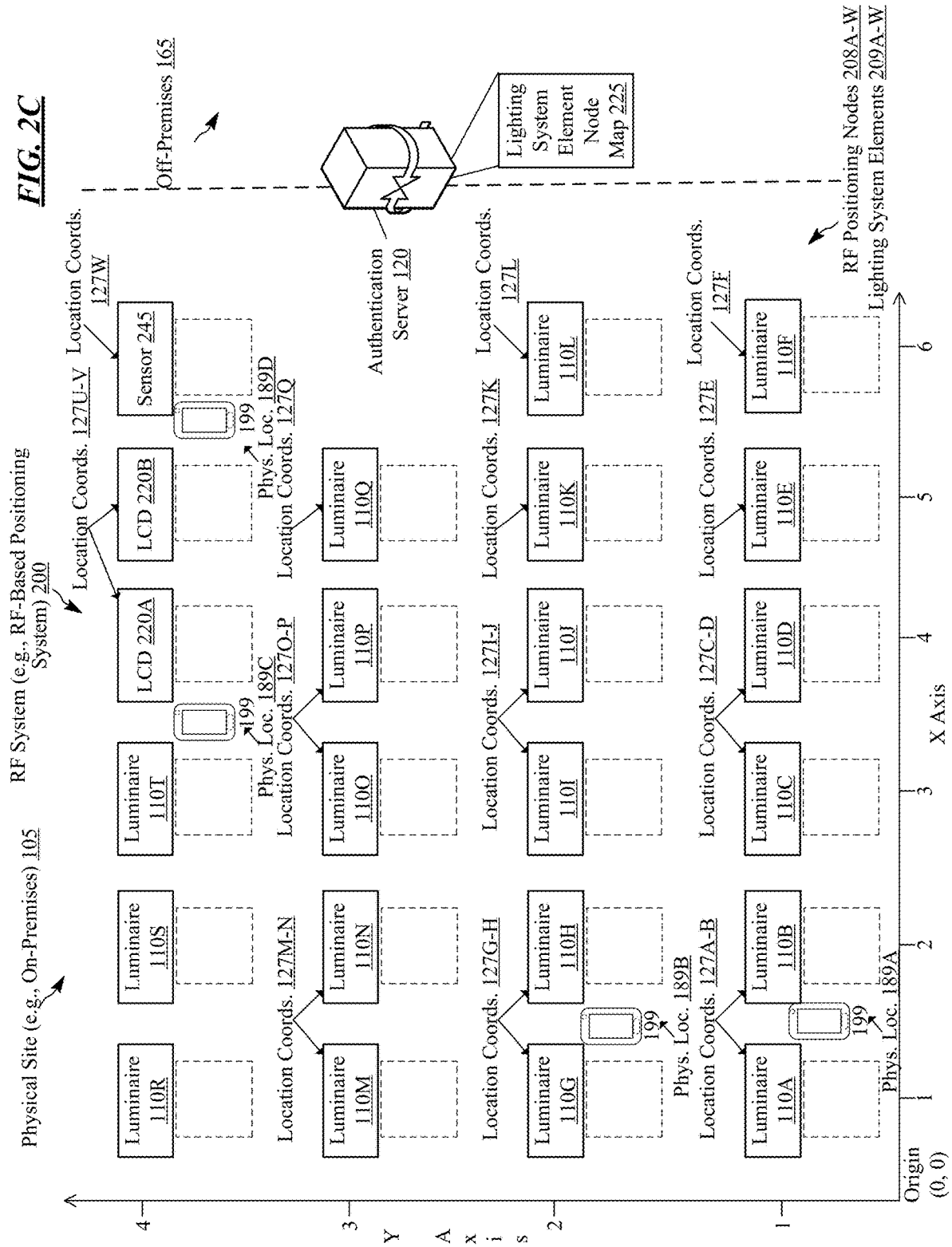

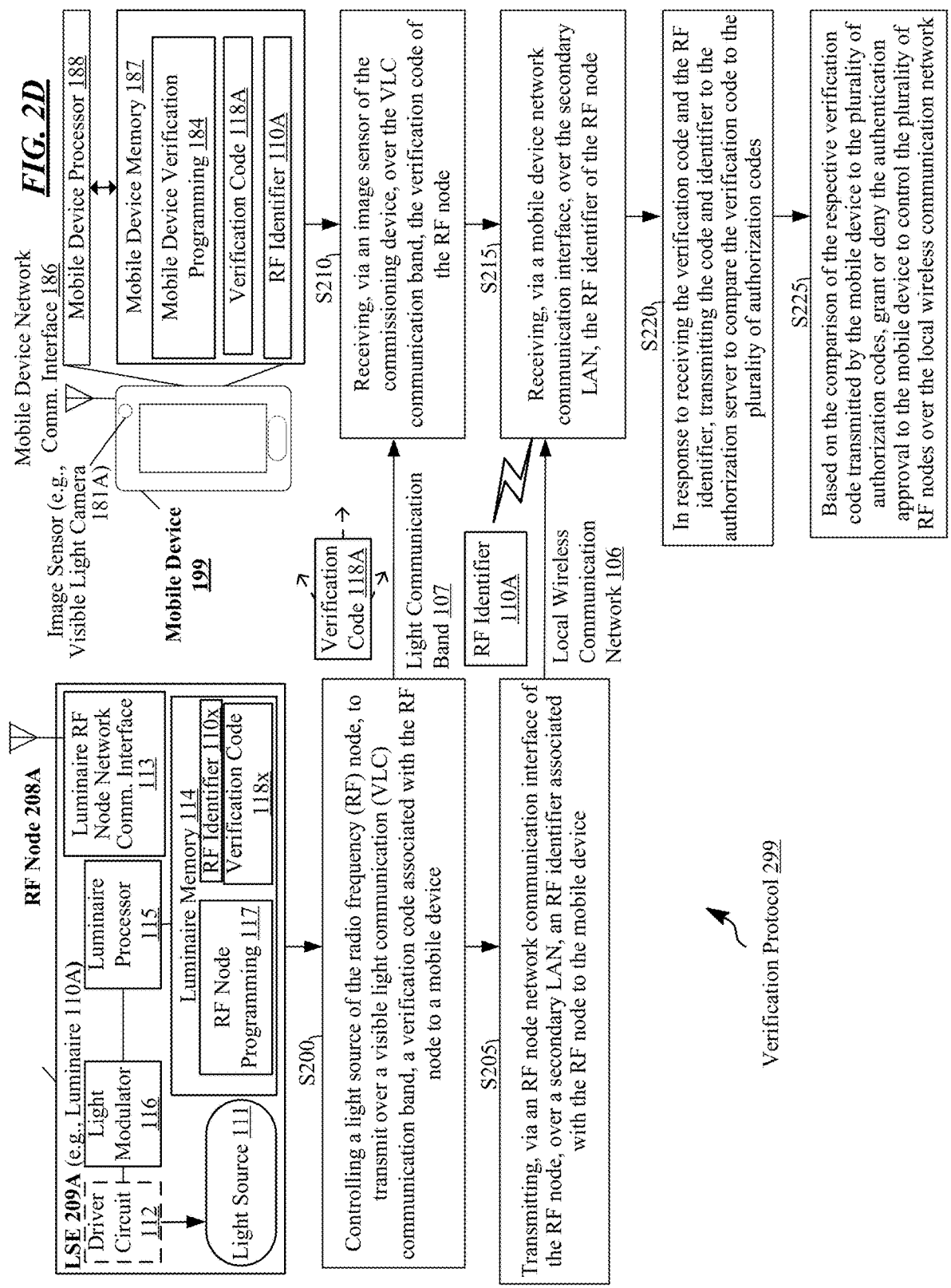

PHYSICAL VERIFICATION AND AUTHORIZATION FOR WIRELESS CONTROL OF A NETWORK

TECHNICAL FIELD

The present subject matter relates to techniques and equipment to verifying a mobile computing device using visible light communication with a network of luminaires for the purpose of maintaining the network of luminaires.

BACKGROUND

Wireless communications technologies such as Bluetooth Low Energy (BLE) typically provide a measure of network security by means of encryption. That is, a device must possess certain numbers (cryptographic keys) if it is to send and receive messages through the network. Additional keys or passwords may be required to enable a device to control the network (e.g., order a change of firmware).

Currently, a human being goes to a site housing a wireless luminaire network and communicates with its BLE or other wireless capability using a mobile device. The user supplies a username and password through their mobile device to a server via the Internet or some other channel; if the username and password are correct, the server securely transmits to the user's mobile device all necessary codes, such as cryptographic keys, needed by the device to use and control the network.

This approach is practical is good but is subject to a range of attacks. For example, a radio device outside a store, or hidden inside it, can intercept data communications among nodes of the luminaire network, and from such data it may be possible to crack the encryption of the network, intercept passcodes, attempt man-in-the middle attacks, or otherwise break security. A mobile device could then be equipped to enter the store, access its network, and control or disable it: or, signals from a sufficiently powerful off-site transmitter could be used to access the network and control or disable it. Given the large resources available to some corporations, governments, and other actors, as well as the high skill of some independent hackers, the possibility of sophisticated efforts to break cryptographic security must be taken seriously.

Additionally, it is possible that due to human error a legitimate, authorized employee might go to the wrong store and update software inappropriately or do other inadvertent harm.

BRIEF DESCRIPTION OF THE DRAWINGS

The drawing figures depict one or more implementations in accord with the present teachings, by way of example only, not by way of limitations. In the figures, like reference numerals refer to the same or similar elements.

FIG. 1C is a luminaire node map of the lighting system of FIGS. 1A-B depicted in a table format.

FIG. 2A is a high-level functional block diagram of an example of an RF system of networks and devices that support authenticating and verifying a mobile device for administration of luminaires of an indoor space.

FIG. 2C is a schematic of the RF system of FIGS. 2A-B that includes a visual layout of twenty-three LSEs as represented by a respective set of location coordinates.

FIG. 2D is a verification protocol procedure for the RF system (e.g. lighting system) that is implemented by an RF node and a mobile device of FIGS. 2A-C and FIGS. 1A-D.

DETAILED DESCRIPTION

Figure 1A:
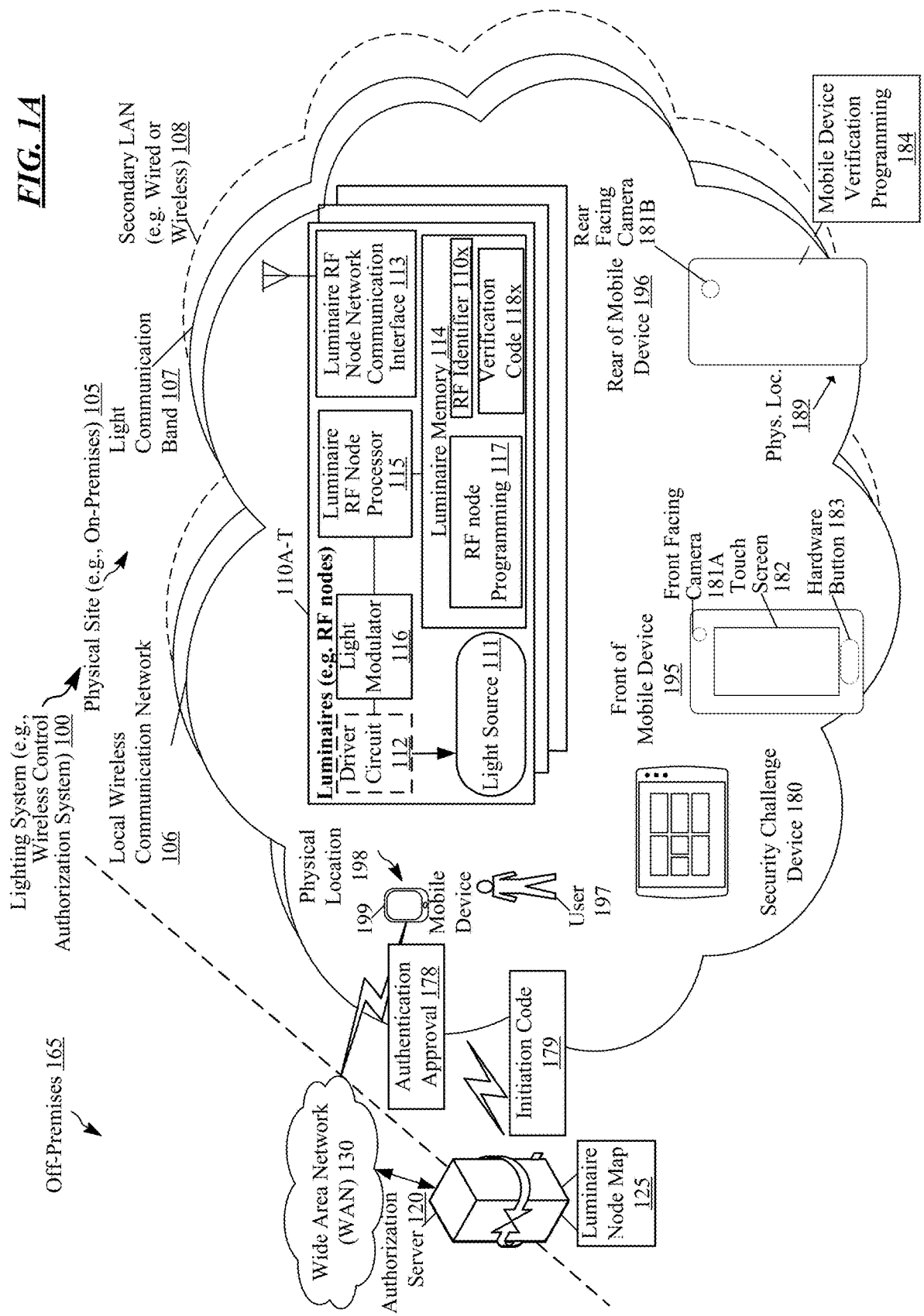
FIG. 1A is a high-level functional block diagram of an example of a lighting system of networks and devices that support authenticating and verifying a mobile device for administration of luminaires of an indoor space (e.g., on premises).

Techniques are described for assuring, more securely than any username-and-password scheme, that only persons and devices authorized for a particular site are enabled to control a wireless luminaire network at physical site. The techniques increase the probability that only a person authorized is enabled to control the wireless luminaire network at the particular physical site within a certain time window.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In the examples, herein, the luminaires 110A-T and lighting system elements 209A-W are just one example of RF nodes 208A-W. The RF node verification and authorization techniques, such as verification protocol 299, described herein can be applied to other types of RF nodes 208A-W. Generally, the RF node 209A includes a minimum subset of components of the lighting system elements 209A (e.g., luminaire 110A) shown in FIG. 5, such as the RF node network communication interface 113, memory 114 (including the depicted RF node programming 117 and data, such as verification code 118A, RF identifier 110A, processor 115, and power supply 305. The verification code 118A can be a randomly generated code for the respective physical site 105, or the verification code 118A can be or a visible light communication (VLC) identifier of the respective RF node, or another short-wave identifier such as an infrared identifier.

The examples in the drawings and described below generally relate to authenticating and verifying a user 197 of a mobile device 199 via RF devices as RF nodes 209A-W in an RF system 200. In one example, during authentication and verification of a user 197 within a luminaire-based positioning system, a virtual map of a physical installation of luminaires 110A-T within a physical site 105 of a room, building, etc. or an outdoor space (e.g., streetlights) is created.

Although the discussion herein is focused on light fixture type luminaires that have a fixed position in a space, it should be understood that other types of luminaires can be used/sensed in lieu of light fixtures, such as lamps, particularly if the lamps have a fixed position in the space. The term "luminaire" as used herein, is intended to encompass essentially any type of device, e.g., a light fixture or a lamp, that processes energy to generate or supply artificial light, for example, for general illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaries in or on a particular premises have other lighting purposes, such as signage for an entrance or to indicate an exit. In most examples, the luminaire(s) illuminate a space of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The "luminaire" can include other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). As noted, the lighting component(s) are located into an integral unit, such as a light fixture or lamp implementation of the luminaire. The electronics for driving and/or controlling the lighting component(s) may be incorporated within the luminaire or located separately and coupled by appropriate means to the light source component(s).

The term "luminaire-based positioning system" or "lighting system," as used herein, is intended to encompass essentially any type of system that either includes a number of such luminaires coupled together for data communication and/or luminaire(s) coupled together for data communication with one or more control devices, such as wall switches, control panels, remote controls, central lighting or building control systems, servers, etc.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting," as used herein, are intended to encompass essentially any type of lighting in which a luminaire produces light by processing of electrical power to generate the light. A luminaire for artificial lighting, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type.

Illumination light output from the light source of the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output of the light source of the light source of the luminaire.

Terms such as "lighting device" or "lighting apparatus," as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). The electronics for driving and/or controlling the lighting component(s) may be incorporated within the luminaire or located separately and coupled by appropriate means to the light source component(s).

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below. FIG. 1A is a high-level functional block diagram of an example of a lighting system or a wireless control authorization system 100 of networks and devices that utilize luminaires 110A-T to verify a mobile device 199 at a physical site (e.g., on premises) 105. Lighting system 100 provide a variety of communications in support of determining a physical location 198 of a mobile device 199 of a user 197 in the physical site 105. In the example of FIGS. 1A-D, the lighting system 100 includes a wireless control authorization system formed of a plurality of radio frequency (RF) nodes configured as luminaires 110A-T for a positioning application to determine physical location 198 in the physical site 105 of a mobile device 199 of a user 197 in the physical site 105. But the visible light communication (VLC) verification protocols and procedures do not need to be used in a positioning application and can more generally be used to authenticate and verify the mobile device 199 of a user 197 into a local wireless communication network 106 of the lighting system 100. Although described in terms of luminaires 110A-T and the physical site 105 (e.g., on premises), the luminaires 110A-T are just one example of a deployment environment of an RF node 208A-W, which can be deployed in other ways, as described in FIGS. 2A-D below.

As shown, lighting system 100 includes a plurality of RF nodes 110A-T located in the physical site 105, such as a grocery store. The plurality of RF nodes 110A-T includes twenty (20) luminaires 110A-T. Although the example lighting system 100 is described for the physical site 105, the lighting system 100 can be deployed in an outdoor space (e.g., using streetlights).

Each respective one of the luminaires 110A-T includes an optical wireless communication interface, which includes a light source 111 to emit light; and a light modulator 116 coupled to the light source 111 to modulate the emitted light from the light source 111 for light communication over a light communication band 107. The light communication in this example is visible light communication, but in other examples the light communication may be an infrared light communication band or an ultraviolet light communication band. In further examples, instead of an optical wireless communication interface, the luminaires include a short range wireless communication interface, which communicates wirelessly over a visible light communication band, an infrared light communication band, or an ultrasonic communication band.

A light communication band 107 is a data communications network variant, which in this example is VLC and uses visible light between 400 and 800 THz (780-375 nm), and is a subset of optical wireless communications technologies. VLC can be done by having luminaires 110A-T output oscillating visible light (e.g., projection of a barcode) in combination with the illumination space lighting.

The light modulator 116 modulates the light source 111, such as general illumination light source 111, on and off to optically send light signals encoding data. The circuits comprising the light modulator 116 can include solid state transistors controlled by a digital input. Light modulator 116 turns general illumination light source 111, e.g., LEDs, on and off by allowing or preventing current flow. When current flows through the light modulator 116 with the switches closed the LEDs turn on, and when the switches are open in the modulator no current can flow and the LEDs turn off. When the light modulator 116 is controlled by an additional logic component, such as luminaire RF node processor 115, the light modulator 116 has the ability to send repeating patterns of on/off signals in order to transmit digital data through the visible light. The light modulator 116 interfaces directly in between the driver circuit 112, and is controlled by the luminaire RF node processor 115.

The luminaire RF node processor 115 provides the digital input signal to the light modulator 116. The luminaire RF node processor 115 sends a pre-determined sequence of signals to the light modulator 116 which then interfaces with driver circuit 112 to modulate the outgoing visible light from the general illumination light source 111. The luminaire RF node processor 115 provides the digital input signal to the light modulator 116. This function can also be achieved using a field programmable gate array (FPGA), but typically consumes more power with added complexity.

Depending on the type of light source 111, luminaires 110A-T can further include a driver circuit 112 coupled to the light source 111 to control a light source operation of the light source 111, in which case the light modulator 116 is coupled to the driver circuit 112 to modulate the emitted visible light from the light source 111 for VLC over the light communication band 107. The light source 111 may be virtually any type of light source 111 suitable to providing the intended type of light output that may be electronically controlled. The light source 111, for example, may provide visible light output as providing visible illumination for human occupancy or the like and/or visible light source based positioning. The light source 111 may be of the same general type in all of the luminaires 110A-T, e.g. all formed by some number of light emitting diodes (LEDs); although in many installations, some numbers of the luminaires 110A-T may have different types of light sources 111, e.g. some use LEDs, some use compact or tube type fluorescent sources, etc. Thus, the light source 111 can include one or more organic light emitting diodes (OLEDs); one or more micro LEDs; one or more nanorod or nanowire LEDs; at least one fluorescent lamp; or at least one halogen lamp. An LED type of light source 111 typically utilizes a driver circuit 112 to control light source operation.

In the examples herein, the luminaires 110A-T include at least one or more components forming a light source 111 for generating the artificial illumination light for a general lighting application as well as a local wireless network communication interface, shown as luminaire RF node network communication interface 113. In several illustrated examples, such luminaires 110A-T may take the form of a light fixture, such as a pendant or drop light or a downlight, or wall wash light or the like. For example, luminaires 110A-T include a pendant down light suspended/hanging from the ceiling, a 2×4 feet light fixture flush mounted on the ceiling, or sconces hung on the wall. Other fixture mounting arrangements are possible. For example, at least some implementations of the luminaires 110A-T may be surface mounted on or recess mounted in a wall, ceiling or floor. Orientation of the luminaires 110A-T and components thereof are shown in the drawings and described below by way of non-limiting examples only. The luminaires 110A-T may take other forms, such as lamps (e.g. table or floor lamps or street lamps) or the like. Additional devices, such as fixed or controllable optical elements, may be included in the luminaire, e.g. to selectively distribute light from the illumination light source.

Each respective one of the luminaires 110A-T further include a luminaire radio frequency (RF) node network communication interface 113 configured for short-range wireless communication over the local wireless communication network 106. In the example, the local wireless communication network 106 may be configured as a wireless mesh network (e.g., ZigBee, DECT, NFC, etc.), a personal area network (e.g., Bluetooth or Z-Wave), or Wi-Fi.

Each respective one of the luminaires 110A-T further includes a luminaire RF node memory 114 and a luminaire RF node processor 115. Luminaire RF node memory 114 includes: a respective RF identifier 110A-T of the luminaire 110A-T, and (ii) a respective verification code 11A-T associated with the respective physical site 105. For example, the respective verification code 118A-T is for verifying a mobile device 199 of the user 197. Luminaire RF node processor 115 is coupled to the light modulator 116, the luminaire RF node network communication interface 113, and the luminaire RF node memory 114.

Figure 3:
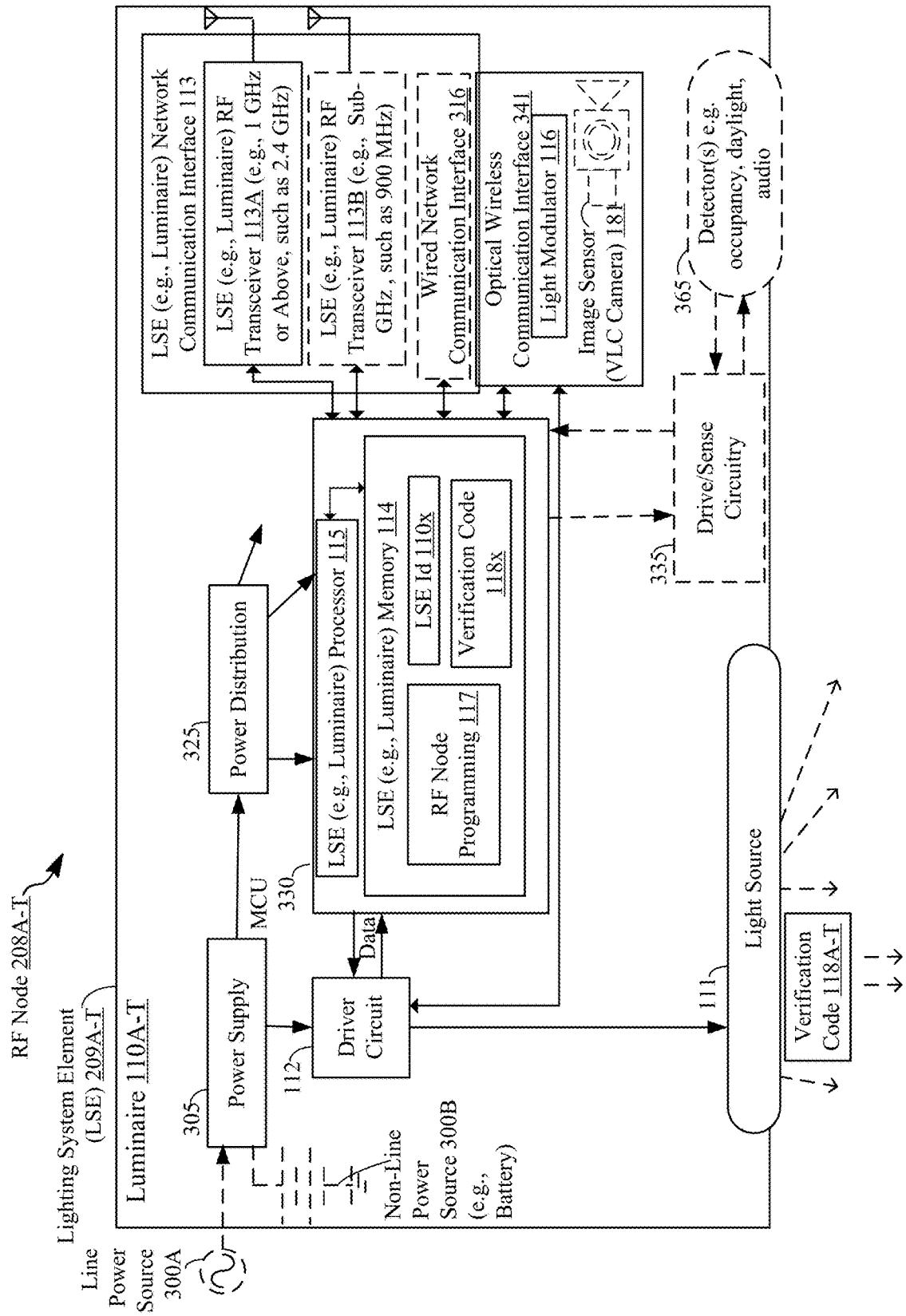
FIG. 3 is a block diagram of RF nodes (e.g., LSEs), specifically luminaires, that communicate via the RF system of FIGS. 2A-D and lighting system of FIGS. 1A-D.

As further described in FIG. 3, the luminaires 110A-T can include a luminaire RF node network communication interface 113 that may include separate radios that operate at two different frequencies, such as a first wireless luminaire RF node network communication interface 113A at 1 GHz or above (e.g., 2.4 GHz for BLE), and a second wireless luminaire RF node network communication interface 113B at sub-GHz (e.g., 900 MHz for WiFi). In some examples, the luminaire RF transceivers 113A-B can operate at 5 GHz.

The luminaires 110A-T are configured to verify a mobile device 199 that includes mobile device verification programming 184 for the verification functions of the lighting system 100. For example, mobile device 199 receives verification codes 118A-T from luminaires 110A-T and can be a handheld mobile device (e.g., mobile phone, tablet computer, laptop computer, etc.) with human interfacing mechanisms sufficient to perform clear and uncluttered user directed operations. Mobile device 199 includes a front facing visible light camera 181A, a touch screen 182, a hardware button 183 located on a front side 195, and a rear facing visible light camera 181B located on a rear side 196 of the mobile device 199. Visible light cameras 181A-B can include a rolling shutter camera for VLC communication purposes.

Lighting system 100 further includes an authorization server 120. The authorization server 120 is a device that provides access between a wide area network (WAN) 130 and the local wireless communication network 106. The WAN 130 (e.g., Internet) can be a cellular network, optical fiber, cable network, or satellite network that can be connected to via Ethernet, for example. The authorization server 120 may provide routing access, and other services for the luminaires 110A-T residing at the physical site 105, for example. The authorization server 120 may send an initiation code 179, which indicates to the luminaires 110A-T that the luminaires 110A-T begin emitting their verification codes 118A-T. This initiation code 179 may initiate verification code emission at all luminaires 110A-T, or at a subset of luminaires 110A-B, or even at a single luminaire 110A to emit the verification code 118A. The authorization server additionally sends an authentication approval 178 to the mobile device, once the mobile device 199 has been verified and authorized by the wireless control authorization system 100.

The authorization server 120 may be split among one or more computing devices, with some of those computing devices residing off-premises; meaning, the those off-premises computing devices of the authorization server 120 are remote servers hosted on the Internet to store, manage, and process data, rather than the local computing devices operating as part of the authorization server 120.

Lighting system 100 may still further include a security challenge device 180. The security challenge device 180 is a computing device with a network connection to the authorization server 120, and requires the user 197 to enter a username, password, challenge code, or other form of verification when prompted. The security challenge device 180 may be a 10-digit security key pad, a fingerprint scanner, or even a button, if the button is placed in a secure room 185. The security challenge device 180 may be used either in sequence, before or after the mobile device 199 has the physical location 189 verified by RF or VLC methods, or the security challenge device 180 may be used in parallel, requiring the security challenge to be completed by the user 197 while the mobile device 199 has a verified physical location 189 near the security challenge device. The security challenge device 180 may be integrated into an RF node 110A-T, including the touch screen device 800B as described in FIG. 8B.

It should also be understood that the communication protocols over the local wireless communication network 106 may be varied, and thus may be via nLight® (commercially available from Acuity Brands Lighting), digital multiplex (DMX) control, Fresco® control network (FCN) (commercially available from Acuity Brands Lighting). FCN, DMX control, nLight®, and Z-Wave are lighting-centric networks that control a variety of luminaires 110A-T. The WAN 130 is a separate network but with a shared application protocol for verifying and authenticating the mobile device 199 via the luminaires 110A-T. It should be appreciated, however, that the local wireless communication network RF of the local wireless communication network 106 and WAN 130 in a different implementation may be a different part of the same network tree or star network, and therefore may not be separate networks and can utilize the same network communication protocols. In some examples, the lighting system 100 can further include an optional secondary network 108 (e.g., wired or wireless LAN), such as a backhaul network, or a wireless broadband network, for communication between the luminaires 110A-T, mobile device 199, and the authentication server 120.

Figure 1B:
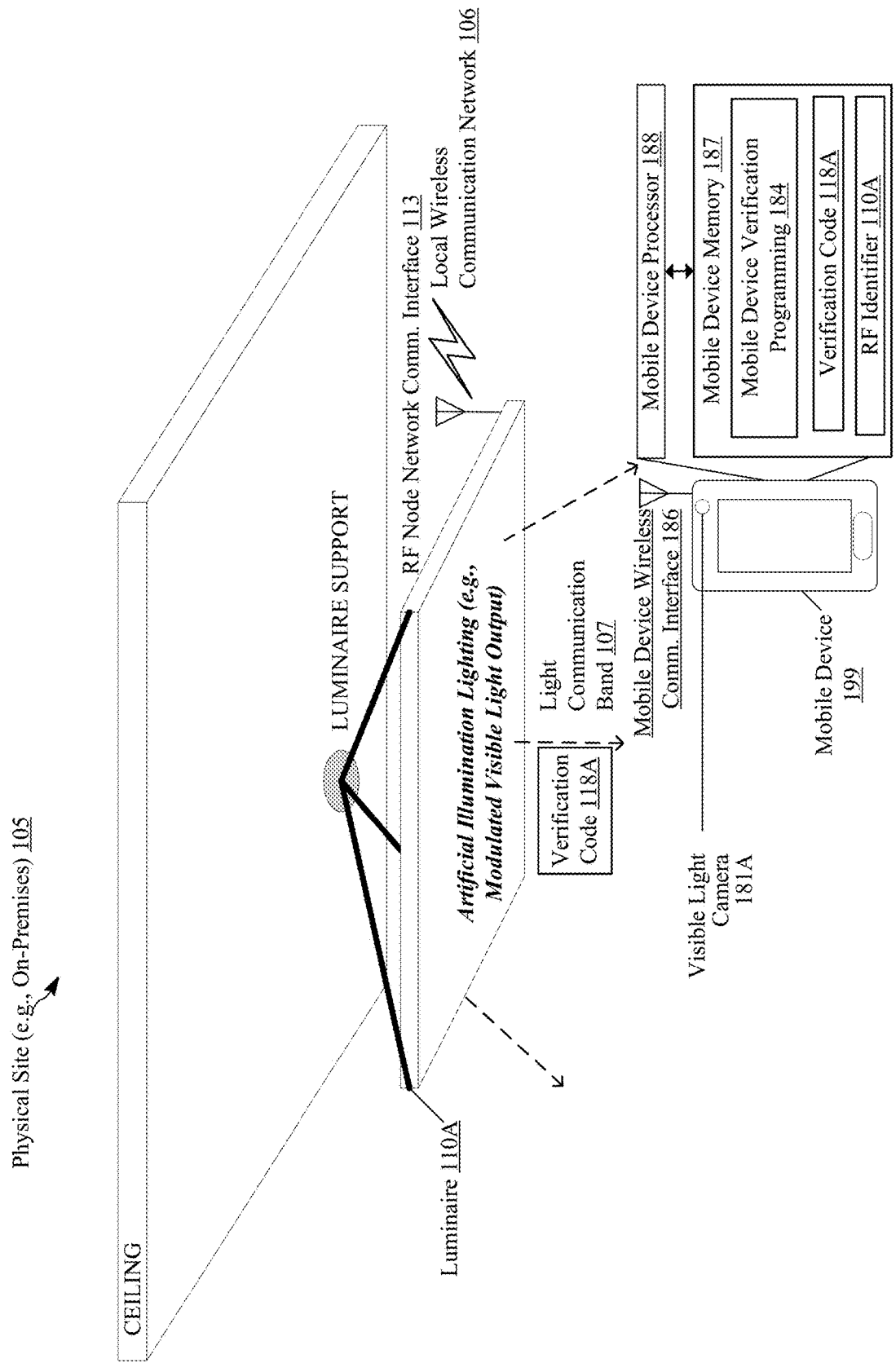
FIG. 1B is an isometric view of a luminaire mounted in the indoor space and in communication with a mobile device.

FIG. 1B is an isometric view of a luminaire 110A mounted in the physical site 105 and in communication with the mobile device 199. In the example of FIG. 1B, the drop light fixture type luminaire 110A was hung below the ceiling by multiple support rods or cables attached to a number of brackets on the luminaire 110A. The example of FIG. 1B represents a pendant type light fixture implementation of the luminaire 110A in which the fixture has a bracket on a surface opposite the artificial illumination lighting output, providing an attachment point for a single strut attached to or through the ceiling. Other aspects of structure, orientation and operation of the other luminaire 110B-T is generally similar to the luminaire 110A discussed herein. Location of electronics should be decided (e.g. in ceiling or on fixture) size and weight considerations, since fixture weight may be an issue. For example, the electronics of the lighting device may be in the suspended luminaire portion or included in or near the support structure in our above the ceiling to reduce the weight held below the ceiling by the support(s) and bracket(s).

As shown in FIGS. 1A-B, the respective luminaire is an RF node 110A-T which includes RF node programming 117 in the luminaire RF node memory 114. Execution of the RF node programming 117 by the luminaire RF node processor 115 configures the respective RF node 110A-T to implement the following functions. Luminaire 110A-T controls the light source 111, via the light modulator 116, to modulate the emitted light to transmit over the light communication band 107, the respective physical site verification code 118A-T to the mobile device 199.

Alternatively, luminaire 110A-T controls the light source 111, via the light modulator 116, to modulate the emitted light to transmit over the light communication band 107, the respective physical site verification code 118A-T to the mobile device 199 after receiving an initiation code 179 from the authentication server 120.

Mobile device 199 includes the mobile device visible light camera 181A as a light sensor to receive light communication over the light communication band 107. Mobile device 199 further includes a mobile device wireless communication interface 186 configured for wireless communication over the local wireless communication network 106, a secondary network 108, or both the local wireless communication network 106 and the secondary network 108. Mobile device 199 further includes a mobile device processor 188 coupled to the visible light camera or light sensor 181A and a mobile device memory 187. Mobile device 199 further includes the mobile device verification programming 184 in the mobile device memory 187.

Typically, at manufacture, luminaires 110A-T are programmed with a distinctive first identification (ID) number, e.g. verification code 118A-T that is distinct from a second ID number of the RF identifier 110A-T. Alternatively or additionally, the verification code 118A-T can be a random number generated by the luminaires 110A-T to serve as a distinctive temporary ID or a nonce string. In another alternative verification code 118A-T is a distinctive number, such as a true luminaire identifier 110A-T persistently associated with the luminaires 110A-T or just a random number into the luminaire RF node memory 114 of the luminaire 110A-T after manufacture. In any case, the luminaire 110A-T is capable of broadcasting data, including the distinctive verification code 118A-T, which can be a random number or a series of numbers, to an environment, such as physical site 105, by modulating a respective visible light output in a manner not visible to the human eye. The visible light output is detectable by mobile device 199 (e.g., via visible light cameras 181-B) and can be quickly decoded. A common method of VLC modulation is to rapidly vary luminaire brightness too quickly for a human eye to detect.

Execution of the mobile device verification programming 184 by the mobile device processor 188 configures the mobile device 199 to implement the following functions. Mobile device 199 logs in to the authorization server 120, via the mobile device network communication interface 186, over the secondary network 108. Logging in to the authorization server 120 may include entering a password or a both a username and password to obtain access to the authorization server 120. Mobile device 199 receives, via the mobile device visible light camera or image sensor 181A-B, over the light communication band 107, the respective verification code 118A-T. Mobile device 199, in response to logging in to the authorization server 120 and receiving the respective verification code 118A-T, transmits, via the mobile device network communication interface 186, the respective verification code 118A-T to the authorization server 120. Mobile device 199, in response to transmitting the respective verification code to the authorization server, obtains, via the mobile device network communication interface over the secondary network, the authentication approval 178 to control the plurality of RF nodes or luminaires 110A-T over the local wireless communication network 106. Obtaining the authentication approval 178 may include receiving via the mobile device network communication interface 186 over the secondary network 108, an authorization key or code (element 555 of FIG. 5) with the authentication approval 178 to control the plurality of RF nodes or luminaires 110A-T via the local wireless communication network 106. The authorization key or code 555 may only be valid for a fixed time window, such as eight hours.

Additionally, the mobile device 199 may, in response to being granted authentication approval 178 to control the plurality of RF nodes or luminaires 110A-T over the local wireless communication network 106 based on a comparison by the authentication server 120, instructs a respective RF node or luminaire 110A to enter into a diagnostics, maintenance, or administrative mode. The mobile device 199 issues control commands for diagnostics, maintenance, or administration to the respective RF node or luminaire 110A, via the mobile device network communication interface 186 over the local wireless communication network 106. The mobile device 199 transmits, via the mobile device network communication interface 186 over the secondary network 108, the initiation code 179 to the authorization server 120: this is the initiation code 179 the authorization server 120 sends to the luminaires 110A-T.

FIG. 1C is the luminaire node map 125 of the lighting system 100 of FIGS. 1A-B depicted in a table format. The luminaire node map 125 is of luminaires 110A-T in the physical site 105. Each of the twenty luminaires 110A-T is assigned a luminaire position 1-20, shown as a plurality of luminaire settings 126A-T, in the luminaire node map 125 ranging from one to twenty. The twenty positions cover most of the area of the physical site 105 for which positioning of the mobile device 199 of the user is 197 is desired. As shown, a respective luminaire setting 126A-T of a respective luminaire 110A-T includes: (a) a respective luminaire identifier 110A-T of the respective luminaire 110A-T (stored as luminaire identifier 128A-T); and (b) the respective verification code 118A-Q associated with the respective luminaire identifier 128A-Q (stored as luminaire verification code 129A-Q). Each luminaire setting 126A-T includes a respective set of location coordinates 127A-T. The respective set of location coordinates 127A-T includes two components: an X location coordinate and a Y location coordinate for each of the luminaires 110A-T.

The luminaire node map 125 has multiple luminaire settings 126A-T, including a respective luminaire setting 126A-T of each luminaire 110A-T in the physical site 105. The luminaire node map 125 also has multiple sets of location coordinates 127A-T. Each set of location coordinates 127A-T is stored in association with the respective luminaire setting 126A-T. A two-dimensional Cartesian coordinate system is used in the example luminaire node map 125 for each of the sets of location coordinates 127A-T. However, a three-dimensional coordinate system can be used which includes an additional component along a Z axis for depth or height measurement. For example, if the physical site 105 is a grocery store it can be advantageous to know whether the mobile device 199 is at floor level or near or at the ceiling level. The physical site 105 may also have catwalks above the floor and below the ceiling, and verifying the mobile device 199 user 197 is on the catwalk rather than the floor can also be advantageous.

Figure 1D:
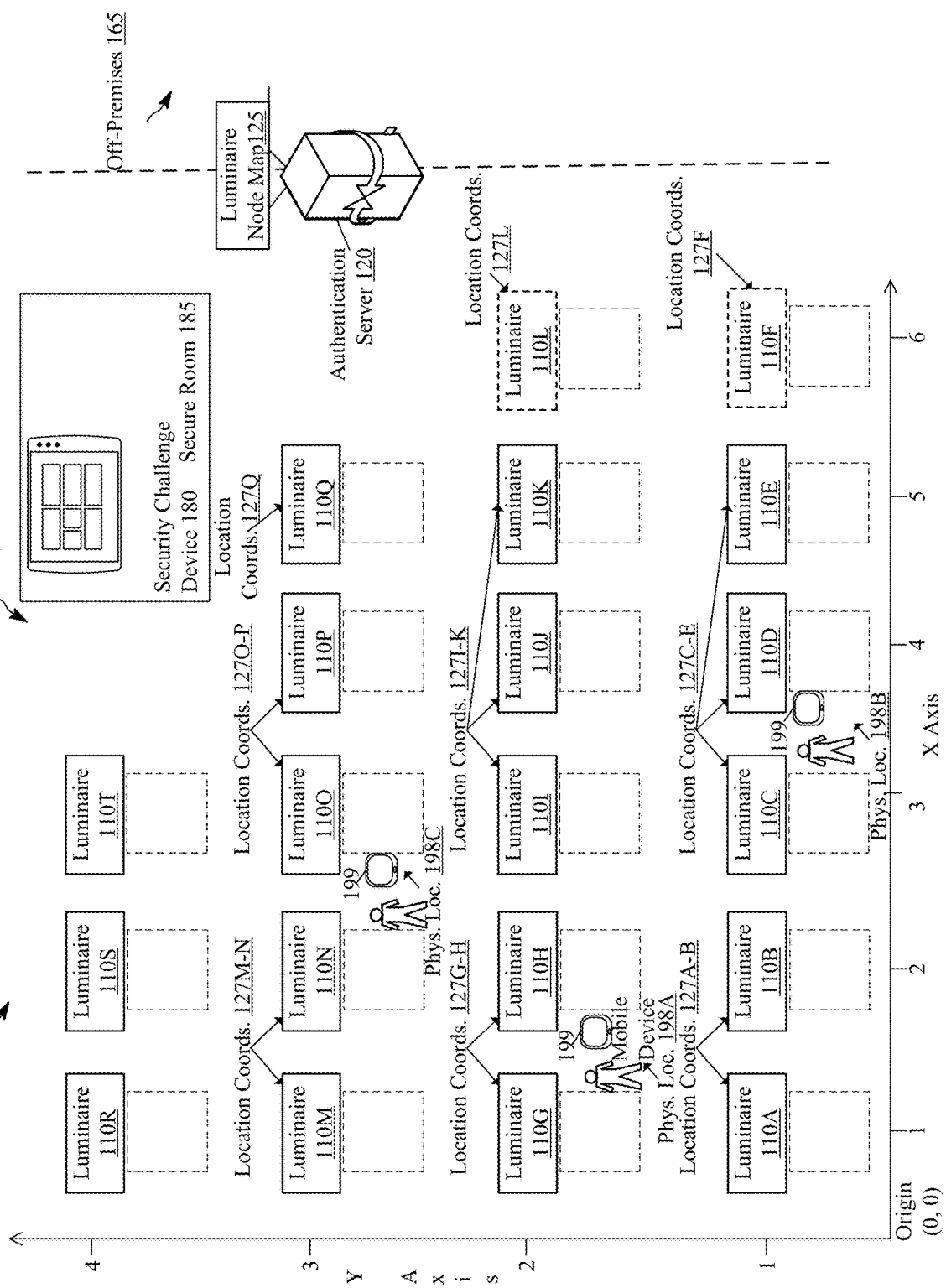
FIG. 1D is a schematic of the lighting system of FIGS. 2A-C that includes a visual layout of twenty luminaires as represented by a respective set of location coordinates.

FIG. 1D is a schematic of the lighting system 100 of FIGS. 1A-D that includes a visual layout of twenty luminaires 110A-T as represented by a respective set of location coordinates 127A-T. As shown, the respective set of location coordinates 127A-T are located on a two-dimensional Cartesian coordinate system, which includes an X axis for horizontal (e.g., lateral) coordinate position and a Y axis for a vertical coordinate position (e.g., longitudinal). In the example of FIG. 1D, all of the twenty luminaires 110A-T are in an operational state. An X location coordinate component of the respective set of location coordinates 127A-T ranges from 1 to 6 in the example, and the Y location coordinate component of the respective set of location coordinates 127A-T ranges from 1 to 4. The X location coordinate and the Y location coordinate cover most of the entire floor area of the indoor space 105, but do not identify the height of the luminaire 110A-Z (e.g., a Z axis component).

Mobile device 199 of the user 197 (e.g., a human or a robot) can be a smartphone, tablet computer, wearables (e.g., hearing aid, Google Glass, smart watch, or implantables), or laptop/personal computer. In the example of FIGS. 1A-D, luminaires 110A-T communicate with the mobile device 199 of the user and the authorization server 120 to determine a physical location 198 of the user 197 at the physical site 105. Generally, the luminaire-based positioning system 100 determines an initial position at the physical site 105, shown as physical location 198, of the mobile device 199 based on several received signal strength indicator (RSSI) data communication measurements (e.g., Bluetooth or WiFi) to three or more luminaires 110A-T. The farther the mobile device 199 is from the luminaires 110A-T, the lower the respective RSSI data communication measurement becomes. Since the set of location coordinates 127A-T of the luminaires 110A-T are all known, the RSSI measurements are the triangulated and/or trilaterated to calculate the physical location 198A of the mobile device 199 of the user 197 within the physical site 105.

As shown in the specific example of FIG. 1D, the user 197 travels through the physical site 105 carrying the mobile device 199 to three different physical locations 198A-C. As the physical location 198A-C of the mobile device 199 changes, different luminaires 110A-T are used to take the RSSI measurements. The known sets of location coordinates 127A-T of those luminaires 110A-T and RSSI measurements are then used to calculate the physical location 198A-C of the mobile device 199 using triangulation and/or trilateration. This is one is just one possible use of a set of luminaires 110A-T as RF positioning nodes. The luminaires could be streetlights in an outdoor space, which are dimmed on or off. In some examples, the RF positioning nodes are BLE wireless beacons or other wireless RF devices. For example, this VLC verification and authorization technique could be used with wireless beacons that are not luminaires, but include a light source 111 and a light modulator 116. As another alternative, the VLC verification and authorization technique can be used with luminaires, but not in a positioning system, and instead where the physical location coordinates of the luminaires is needed to set up zones for dimming of the lighting system 100.

For the physical location 198A, the RSSI measurements 936A, 936B, 936G, 936H (see FIG. 9) are taken are between the mobile device 199 and luminaires 110A, 110B, 110G, and 110H and the physical location 198A is triangulated and/or trilaterated to the sets of location coordinates 127A, 127B, 127G, and 127H. For the physical location 198B, the RSSI measurements 936C, 936D, 936I, 936I (see FIG. 9) taken are between the mobile device 199 and luminaires 110C, 110D, 110I, and 110J and the physical location 198B is triangulated and/or trilaterated to the sets of location coordinates 127C, 127D, 127I, and 127J. For the physical location 198C, the RSSI measurements 936H, 936I, 936N, 9360 (see FIG. 9) taken are between the mobile device 199 and luminaires 110H, 110I, 110N, and 110O and the physical location 198C is triangulated and/or trilaterated to the sets of location coordinates 127H, 127I, 127N, and 127O.

Even if the mobile device 199 is unable to collect RSSI data measurements from three or more luminaires 110A-T, trilateralization with two luminaires 110 to calculate that the physical position 198 of the mobile device 199 between two ambiguous points is still valuable. Furthermore, even a case where the mobile device 199 is able to collect RSSI data measurements of a single luminaire 110, that is still valuable, as it confirms that the mobile device 199 is within a given radius.

Because the authorization server 120 has the luminaire node map 125, the calculation of the physical location 198A-C of the mobile device 199 can be implemented on authorization server 120. Thus, the mobile device 199 is in communication with the authorization server 120 via the secondary LAN 108, WAN 130 or the local wireless communication network 106. However, in some examples, if the luminaires 110A-T include the luminaire node map 125, then the calculation of the physical location 198A-C of the mobile device 199 can be implemented in the luminaires 110A-T. In yet another example, the mobile device 199 itself implements the calculation of the physical location 198A-C. In a final example, the mobile device 199 may be in communication with the authorization server 120, and the authorization server 120 calculates the physical location 198A-C of the mobile device 199, which is sent back to the mobile device 199 via the secondary LAN 108, WAN 130, or the local wireless communication network 106.

Although the RSSI measurements are based on radio frequency (RF) waves, in some examples different ranges in the electromagnetic spectrum can be used for positioning of the mobile device 199. Thus alternatively, visible light modulation of the light source 111 of the luminaires 110A-T, for example, as disclosed in U.S. Pat. No. 9,287,976; titled "Independent Beacon Based Light Position System," issued Mar. 15, 2016 can be used for positioning the mobile device 199. The calculation of the physical location 198A-C at the physical site 105 using VLC light waves is similar to RF waves—triangulation and/or trilateration of the RSSI measurements between the mobile device 199 to three or more luminaires 110A-T whose sets of location coordinates 127A-T are known is used. For example, the light source 111 may be coupled to the light modulator 116 for visible light communication (VLC). VLC technologies for indoor positioning at the physical site 105 to determine the position of a mobile device 199 carried by a user 197 are available from Qualcomm Inc. under the trade name Lumicast™.

Once a physical location 198A-C is obtained, the physical location 198A-C may be used in the verification or authorization processes. For example, when the mobile device 199 is located at physical location 198A, the luminaire 110H may emit light in order to perform verification of the mobile device 199 within the physical site. Alternatively, when the mobile device 199 is located at physical location 198A, the user 197 may be directed to physical location 198B, where the mobile device will be verified using RSSI by luminaires 110C-D and using light emission by luminaire 110D.

The security challenge device 180 is depicted here within a secure room 185. During the verification and authorization processes, the user 197 may be asked to move from the verified physical location 198A-C into the secure room 185, and to complete the security challenge issued by the security challenge device 180. Even if the security challenge is as simple as pressing a button, by virtue of having entered the secure room 185 (for example entering a door locked by key, or by passcode, or a guarded doorway) the user 197 has demonstrated their authorization to the lighting system 100.

As shown in FIG. 2A, the example RF system 200 includes a plurality of RF nodes 208A-W that include lighting system elements (LSEs) 208A-W. LSEs 209A-T are luminaires 110A-T, LSEs 208U-V are lighting control devices (LCDs) 220A-B, and LSE 209W is an occupancy, daylight, or audio sensor 245. RF system 200 does not need to include a lighting system and the RF nodes 208A-W do not need to include lighting system elements 209A-W. For example, RF system 200 can include other types of RF devices as RF nodes connected to the wireless RF communication network of the RF system 200. As shown, occupancy, daylight, or audio sensor 245 includes a microcontrol unit (MCU) 330, drive/sense circuitry 335, and detectors 365, which are described in further detail below. LCD 220B is configured to operate as the security challenge device 180 from FIG. 1A. The local wireless communication network 106 is configured to transmit a light source operation command from the lighting control device 220A-B or the occupancy, daylight, or audio sensor 245 to the luminaire 110A to control an artificial illumination lighting of the luminaire 110A. The RF node network communication interface 113 of the respective RF node 208A receives the light source operation command over the local wireless communication network 106. The RF nodes 208A-T do not have to include the light source 111, driver circuit 112, drive/sense circuitry 335, and detector(s) 365 components.

Figure 2B:
FIG. 2B is a lighting system element (LSE) node map of the RF system of FIG. 2A depicted in a table format.

FIG. 2B is the lighting system element (LSE) node map 225 of the RF system 200 of FIG. 2A depicted in a table format. Each of LSEs 209A-W are assigned a LSE position 1-23 ranging from one to twenty-three, shown as LSE settings 226A-W, in the LSE node map 225 ranging from one to twenty-three. The twenty-three positions cover most of the area of the physical site 105 for which positioning of the mobile device 199 of the user is 197 is desired. As shown, a respective LSE setting 226A-W of a respective LSE 209A-W includes: (a) a respective LSE identifier 209A-W of the respective LSE 209A-W (stored as LSE identifier 228A-W); and (b) the respective verification code 118A-W associated with the respective LSE identifier 228A-W (stored as LSE verification code 229A-W). Each LSE setting 226A-W includes a respective set of location coordinates 127A-W. The respective set of location coordinates 127A-W includes two components: an X location coordinate and a Y location coordinate for each of the LSEs 209A-W.

FIG. 2C is a schematic of the RF system 200 of FIGS. 2A-B that includes a visual layout of twenty-three lighting system elements (LSEs) 209A-W as represented by a respective set of location coordinates 127A-W. As shown, the respective set of location coordinates 127A-W are located on a two-dimensional Cartesian coordinate system, which includes an X axis for horizontal (e.g., lateral) coordinate position and a Y axis for a vertical coordinate position (e.g., longitudinal). In the example of FIG. 2C, all of the twenty-three LSEs 209A-W are in an operational state. An X location coordinate component of the respective set of location coordinates 127A-W ranges from 1 to 6 in the example, and the Y location coordinate component of the respective set of location coordinates 127A-W ranges from 1 to 4. The X location coordinate and the Y location coordinate cover most of the entire floor area of the physical site 105, but do not identify the height of the LSE 209A-W (e.g., a Z axis component).

As shown, the mobile device 199 travels through the physical site 105, for example, a human user 197 travels (e.g., walks) through the physical site 105 and carries the mobile device 199. At physical location 189A, mobile device 199 attempts verification by LSEs 209A-B (e.g., luminaires 110A-B). The mobile device 199 takes up position directly below an overhead luminaire 110A. VLC and RF signal strength can be used as an indicator of proximity: e.g., if the mobile device 199 is positioned directly below the luminaire 110A that is part of a planar array of ceiling-mounted luminaires 110A, 110B, 110G, and 110H, then the VLC and RF signals for the verification code 118A of the luminaire 110A will typically be the strongest that the visible light cameras 181A-B and mobile device wireless communication interface 186 of the mobile device 199 detect.

FIG. 2D is a verification protocol 299 procedure for the RF system 200 (e.g. lighting system 100) that is implemented by an RF node 208A and a mobile device 199 of FIGS. 2A-C and FIGS. 1A-D. In some examples, before operation 5200, the mobile device 199 will send an initiation code 179 to the authorization server 120, and consequently to the RF node 208A. The initiation code is sent so that the RF node 208A does not need to constantly broadcast the verification code 118A, and so the authorization server 120 can send an updated verification code 118A that is selected to work with the mobile device 199. In operation 5200, the RF node 208A controls the optical wireless communication interface of the radio frequency (RF) node, to transmit over a visible light communication (VLC) communication band, the verification code 118A associated with the RF node 208A to the mobile device 199. In one example, the RF node 208A then transmits the verification code 118A to the authorization server 120 over the WAN 130, in order to demonstrate that the mobile device 199 is within VLC range of the RF node 208A. In a variation on that example, the verification code 118A sent by the authorization server is split into two sub-codes: the first sub-code is sent to the RF node 208A, while the second sub-code is sent to a second, confirmation RF node 208T. Once the mobile device 199 verifies with the authorization server 120 that the mobile device 199 received the first sub-code, the mobile device 199 user 197 will be directed to the location coordinates 127T of the confirmation RF node 208T. The confirmation RF node controls the confirmation RF node light source via the confirmation RF node light modulator, to modulate emitted light to transmit over the light communication band the second sub-code to the mobile device 199. The mobile device then transmits the second sub-code to the authorization server 120 over the WAN 130, in order to demonstrate that the mobile device 199 is within VLC range of the confirmation RF node 208T. Forcing the user 197 to move around within the physical site 105 makes it more difficult for an unauthorized user 197 to convince the authorization server 120 that the unauthorized user 197 should be granted access to administrate the RF nodes 208A-W. If a single RF node 208A is always used for verification, the VLC pattern could be recorded and replayed fraudulently.

When thousands of RF nodes 208A-W are used for verification, the VLC pattern is much harder to pre-emptively capture, especially if the verification codes 118A-W change on a regular basis, and are only broadcast in response to an initiation code 179. The wireless control authorization system 200 is not limited to only using two RF nodes 208A,T and two sub-codes: any number of RF nodes 208A-W could be used, each with their own sub-code or full verification code 118A-W. Due to the length of a verification code not being fixed in this example, when using two sub-codes the original verification code 118A can be twice as long as a typical verification code 118B: this results in two sub-codes of the same length, equal to a typical verification code 118B. In some examples, in order to ensure the user 197 will need to move from one physical location to another, the two RF nodes 208A,T need to have exclusive broadcast areas; in other words, the mobile device 199 is either within the short range of the respective RF node 208A, or the mobile device 199 is within the short range of the confirmation RF node 208T, or the mobile device 199 is outside the short range of the respective RF node 208A as well as outside the short range of the confirmation RF node 208T.

In this example, but not all examples, operation 5205 occurs: the RF node 208A transmits, via an RF node network communication interface 113 of the RF node 208A, over a secondary LAN 108, an RF identifier 110A associated with the RF node 208A to the mobile device 199. Like the verification code 118A, the mobile device 199 user 197 can be tasked with moving through the physical site 105, and receiving an RF identifier 110T from a second, confirmation RF node 208T. Any number of RF nodes 208A-W could be used in this process, and the RF nodes 208A-W used in RF verification do not need to be the same RF nodes 208A-W used in VLC verification, nor do the RF nodes 208A-W necessarily need to be travelled to in the same order.

Operation 5210 is the operation where the mobile device 199 receives the verification code 118A, verification codes 118A,T, or sub-codes, depending on the implementation. In this example, the RF node 208A only sent a single verification code 118A, and the mobile device 199 only received that verification code 118A over VLC communication via the image sensor 181A of the mobile device 199. Operation 5215 includes the mobile device 199 receiving, via the mobile device network communication interface 186, over the secondary LAN 108, the RF identifier 110A of the RF node 208A. Operation 5215 occurs in examples where operation 5205 occurs: if the RF node 208A does not transmit the RF identifier 110A, then the mobile device 199 cannot receive the RF identifier 110A via the secondary LAN 108.

Figure 5:
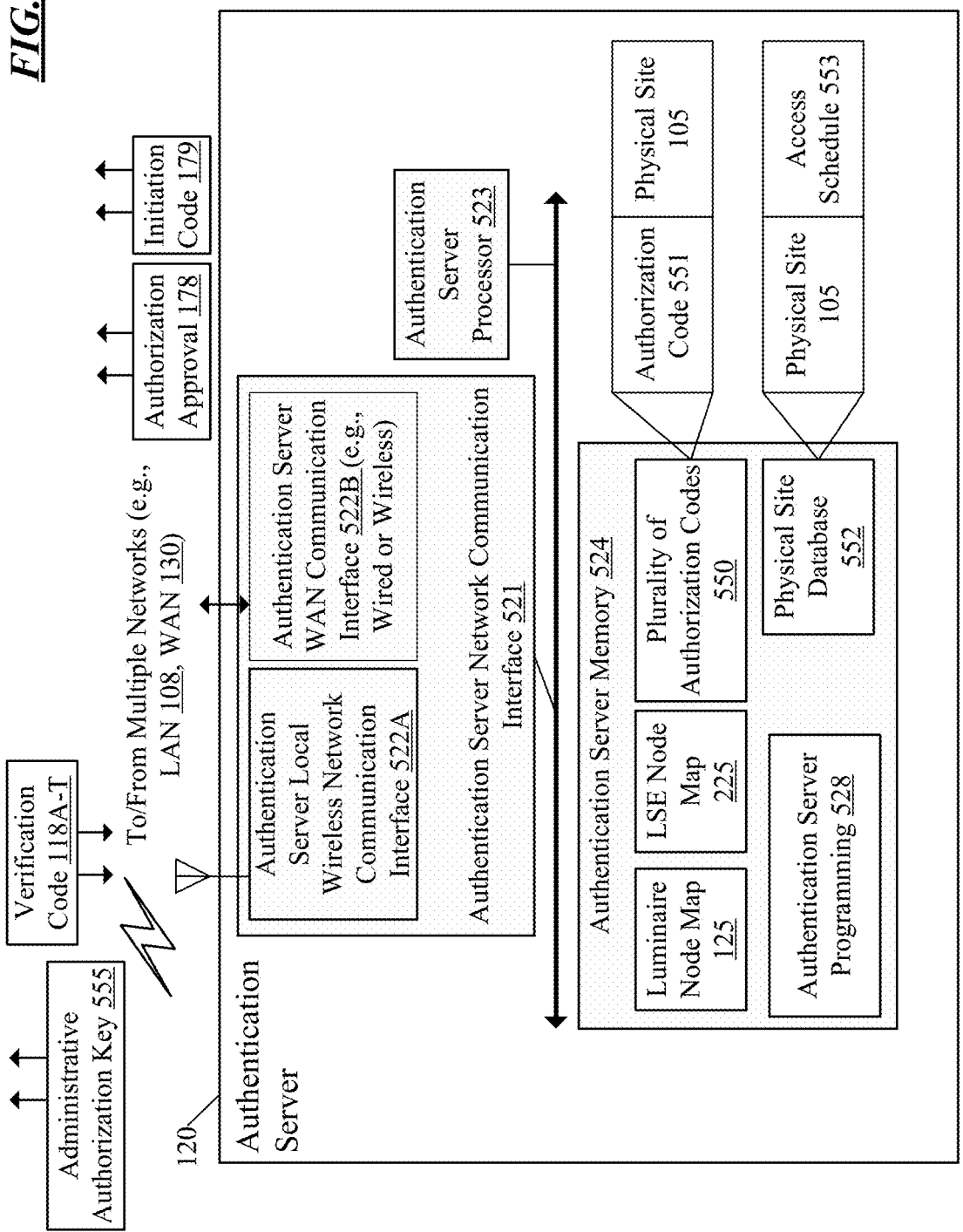
FIG. 5 is a block diagram of an authorization server that communicates via the lighting system of FIGS. 1A-D and RF system of FIGS. 2A-D.

In operation 5220 the mobile device 199, in response to receiving the verification code 118A and the RF identifier 110A, the mobile device 199 transmits the verification code 118A and RF identifier 110A to the authorization server 120 to compare the verification code 118A to the plurality of authorization codes (element 550 of FIG. 5). In operation 5225 the authorization server 120, based on the comparison of the respective verification code 118A transmitted by the mobile device 199 to the plurality of authorization codes 550, grant or deny the authentication approval (element 178 of FIG. 1A) to the mobile device 199 to control the plurality of RF nodes 208A-W over the local wireless communication network 106. This is also the operation where, if the authorization server 120 is configured to work with a security challenge device 180, the user 197 will need to move to the security challenge device 180, and be identified by completing the security challenge.

If the authorization server 120 will require multiple verification codes 118A-W, RF identifiers 110A-W, or subcodes, the authorization server 120 will send a message directing the user 197 of the mobile device 199 to a new set of coordinates, and the process will restart at operation 5200, until the authorization server 120 is satisfied with the number of comparisons made.

FIG. 3 is a block diagram of RF nodes 208A-T (e.g., lighting system elements 209A-T), specifically luminaires 110A-T, that communicate via the RF system 200 of FIGS. 2A-D and lighting system 100 of FIGS. 1A-D. As shown, luminaires 110A-T include a power supply 305 that is driven by a power source 300. Power source 300 can be a line power source 300A that is the form of electrical power that consumers use when they plug in domestic appliances, televisions and electric lamps into wall outlets. Line power source 300A conveys line power, sometimes referred to as "household power," "household electricity," "house current," "powerline," "domestic power," "wall power," "line power," "AC power," "city power," "street power" that is produced by an electric utility provider. Line power source is referred to as grid power, wall power, and domestic power, alternating current (AC) electric power produced and delivered via AC mains to homes and businesses. Alternatively or additionally, power source 300 can be a non-line power source 300B, such as a battery, solar panel, or any other AC or DC source (e.g., a generator) that is not line powered. Power supply 305 may include a magnetic transformer, electronic transformer, switching converter, rectifier, or any other similar type of circuit to convert an input power signal into a power signal suitable for light source 111 and the other depicted components.

Light source 111 includes electrical-to-optical transducers, such as various light emitters. The emitted light may be in the visible spectrum or in other wavelength ranges. Suitable light generation sources include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used. For example, it should be understood that non-micro versions of the foregoing light generation sources can be used.

A lamp or "light bulb" is an example of a single light source. An LED light engine may use a single output for a single source but typically combines light from multiple LED type emitters within the single light engine. Light source 111 can include light emitting diodes (LEDs) that emit red, green, and blue (RGB) light or tunable white light. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output.

Luminaires 110A-T further include a driver circuit 112, for example, an intelligent light emitting diode (LED) driver circuit. Driver circuit 112 is coupled to light source 111 and drives that light source 111 by regulating the power to light source 111 by providing a constant quantity or power to light source 111 as its electrical properties change with temperature, for example. The driver circuit 112 provides power to light source 111. Driver circuit 112 may be a constant-voltage driver, constant-current driver, or AC LED driver type circuit that provides dimming through a pulse width modulation circuit and may have many channels for separate control of different LEDs or LED arrays that comprise light source 111. An example of a commercially available intelligent LED driver circuit 112 is manufactured by EldoLED®. In the case of luminaire 110A-T, the driver circuit 112 is coupled to the light source 111 to control light source operation of the light source 111.

Driver circuit 112 can further include an AC or DC current source or voltage source, a regulator, an amplifier (such as a linear amplifier or switching amplifier), a buck, boost, or buck/boost converter, or any other similar type of circuit or component. Driver circuit 112 outputs a variable voltage or current to the light source 111 that may include a DC offset, such that its average value is nonzero, and/or an AC voltage. For purposes of communication and control, luminaires 110A-T can each be treated as single addressable device that can be configured to operate as a member of one or more lighting control groups or zones. The luminaires 110A-T can be line powered and remain operational as long as power is available.

Luminaires 110A-T include power distribution circuitry 325 driven by the power source 300, an LSE (e.g., luminaire) processor 115, and an LSE (e.g., luminaire) memory 114. As shown, luminaire RF node processor 115 is coupled to an LSE (e.g., luminaire) RF node network communication interface 113 and driver circuit 112. Luminaire processor 114 includes a central processing unit (CPU) that controls the light source operation of the light source 111. Luminaire memory 114, mobile device memory 187, and other memories described herein can include volatile and non-volatile storage.

Luminaires 110A-T include power distribution circuitry 325, a micro-control unit (MCU) 330, optional drive/sense circuitry 335, and optional detector(s) 365. As shown, MCU 330 is coupled to driver circuit 112 and controls the light source operation of the light source 111. MCU 330 includes a luminaire memory 114 (volatile and non-volatile) and a luminaire RF node processor 115 (CPU). The luminaire memory 114 includes the RF node programming 117 for verification and authorization, and the depicted data of a respective RF identifier (id) 110A-T and a respective verification code 118A-T. Luminaires 110A-T include additional programming logic in the luminaire memory 114 for lighting control operation, positioning, maintenance, and diagnostic operations, for example.

Drive/sense circuitry 335 and detectors 365 are optionally on-board the luminaires 110A-T. Detectors 365 can be an occupancy sensor (e.g., infrared sensors or camera for occupancy or motion detection), an in-fixture daylight sensor, an audio sensor, a temperature sensor, or other environmental sensor. Drive/sense circuitry 335, such as application firmware, drives the occupancy, audio, and photo sensor hardware. Drive/sense circuitry 335 of luminaires 110A-T detects state changes in the detector(s) 365, such as occupancy, daylight, and audio sensors.

The power distribution circuitry 325 distributes power and ground voltages to the MCU 330 (e.g., including the luminaire RF node processor 115 and luminaire memory 114) RF node network communication interface 113, drive/sense circuitry 335, and detector(s) 365 to provide reliable operation of the various circuitry on the luminaires 110A-T.

As shown, luminaires 110A-T include the network communication interface 113, which includes at least one luminaire RF node network communication interface 113A-B (e.g., wireless RF network communication interface), for example, a single band, dual-band, or tri-band chipset of wireless transceiver(s) 113A-B configured for wireless communication via separate radios that operate at three different frequencies, such as sub-GHz (e.g., 900 MHz), Bluetooth Low Energy (BLE) (2.4 GHz), and 5 GHz, for example. For example, network communication interface 113 includes two wireless network communication interfaces 113A-B, shown as LSE (e.g., luminaire) RF transceivers (XCVRs) 113A-B. In our example, luminaire network communication interface 113 has a radio set that includes a first luminaire RF node network communication interface 113A configured for short-range wireless communication over a local wireless communication network 106, such as 1 GHz or above communications (e.g., 2.4 GHz for Bluetooth) for verification purposes. The luminaire network communication interface 113 can further include a second luminaire RF transceiver (e.g., radio) 113B configured for wireless communication (e.g., unicast and multicast) via a wireless lighting control network, such as secondary LAN 108, over a wireless lighting control network communication band, such as sub-GHz (e.g., 900 MHz for WiFi) for lighting control and systems operations (or information). Transport layer methods ride on the network layer function of the transceivers 113A-B. The second luminaire RF node network communication interface 113B is optional.

In addition the at least one RF transceiver 113x, the luminaires 110A-T include a luminaire optical wireless communication interface 341. Luminaire optical wireless communication interface 341 includes light source 111, driver circuit 112, and light modulator 116 to transmit data over the light communication band 107. Luminaire optical wireless communication interface 341 transmits the respective verification code 118A-T. Luminaire optical wireless communication interface 341 can also optionally include an image sensor, such as a VLC camera 181 to receive data over the light communication band 107. It should be understood that "multi-band" means communications over the local wireless communication network 106 and the light communication band 107. The communication over the two separate networks and bands 106, 107 can occur simultaneously (concurrently); however, it should be understood that the communication over the two separate RF bands may not actually occur simultaneously. As further shown, luminaires 110A-T can communicate over an optional secondary network 108 (e.g., wired or wireless LAN) via the luminaire RF node network communication interface 113B, such as a backhaul network for communication between the luminaires 110A-T, mobile device 199, and the authentication server 120. As further shown, luminaires 110A-T can include an optional wired network communication interface 316 for communication over the secondary LAN 108.

LSE (e.g., luminaire) processor 115 of the luminaires 110A-T, mobile device processor 188, authentication server processor 523 of authentication server 120, and processors of other RF nodes 208U-W (e.g., lighting system elements 209U-W) described herein serve to perform various operations, for example, in accordance with instructions or programming executable by processors 115, 188, 523. For example, such operations may include operations related to communications with the mobile device 199 during the verification protocol 299 procedure described herein. Although a processor 115, 188, 523 may be configured by use of hardwired logic, typical processors are general processing circuits configured by execution of programming. Processors 115, 188, 523 include elements structured and arranged to perform one or more processing functions, typically various data processing functions. Although discrete logic components could be used, the examples utilize components forming a programmable CPU. A processor 115, 188, 523 for example includes one or more integrated circuit (IC) chips incorporating the electronic elements to perform the functions of central processing unit (CPU).

By way of example a microprocessor (μP), although other processor hardware may serve as the CPU. The CPU and memories, for example, may be implemented by a suitable system-on-a-chip often referred to as a micro-control unit (MCU) 530. In a microprocessor implementation, the processors 115, 188, 523 for example, may be based on any known or available microprocessor architecture, such as a Reduced Instruction Set Computing (RISC) using an ARM architecture, as commonly used today in servers, personal computing devices, mobile devices and other portable electronic devices. Of course, other processor circuitry may be used to form the CPU or processor hardware in luminaires 110A-T, mobile device 199, gateway 120, and other RF nodes 208U-W (e.g., lighting system elements 209U-W described herein. Although the illustrated examples of gateway processor 523 and luminaire RF node processor 115 include only one microprocessor, for convenience, a multi-processor architecture can also be used. It should be noted that a digital signal processor (DSP) or field-programmable gate array (FPGA) could be suitable replacements for the processors 115, 188, 523.

LSE (e.g., luminaire) RF node memory 114 of the luminaires 110A-T, mobile device memory 187 of mobile device 199, authentication server memory 524 of authentication server 120, and memory of other RF nodes 208U-W (e.g., lighting system elements 209U-W are for storing data and programming. In the example, the main memory system 114, 187, 524 may include a flash memory (non-volatile or persistent storage), a read-only memory (ROM), and a random access memory (RAM) (volatile storage). The RAM serves as short term storage for instructions and data being handled by the processors 115, 188, 523 e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions, programming, or application(s) may be software or firmware used to implement any other device functions associated with luminaires 110A-T, mobile device 199, authentication server 120, and other RF nodes 208U-W (e.g., lighting system elements 209U-W). Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 114, 187, 524, or a memory of a computer used to download or otherwise install such programming into the luminaires 110A-T, mobile device 199, authentication server 120, and other RF nodes 208U-W (e.g., lighting system elements 209U-W) or a transportable storage device or a communications medium for carrying program for installation in the luminaires 110A-T, mobile device 199, authentication server 120, and other RF nodes 208U-W.

Figure 2B:
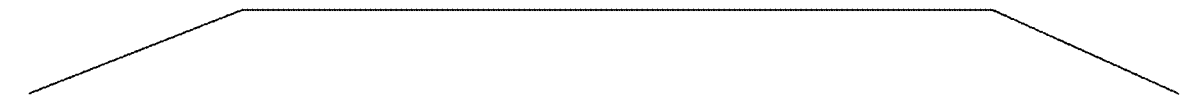
Figure 4:
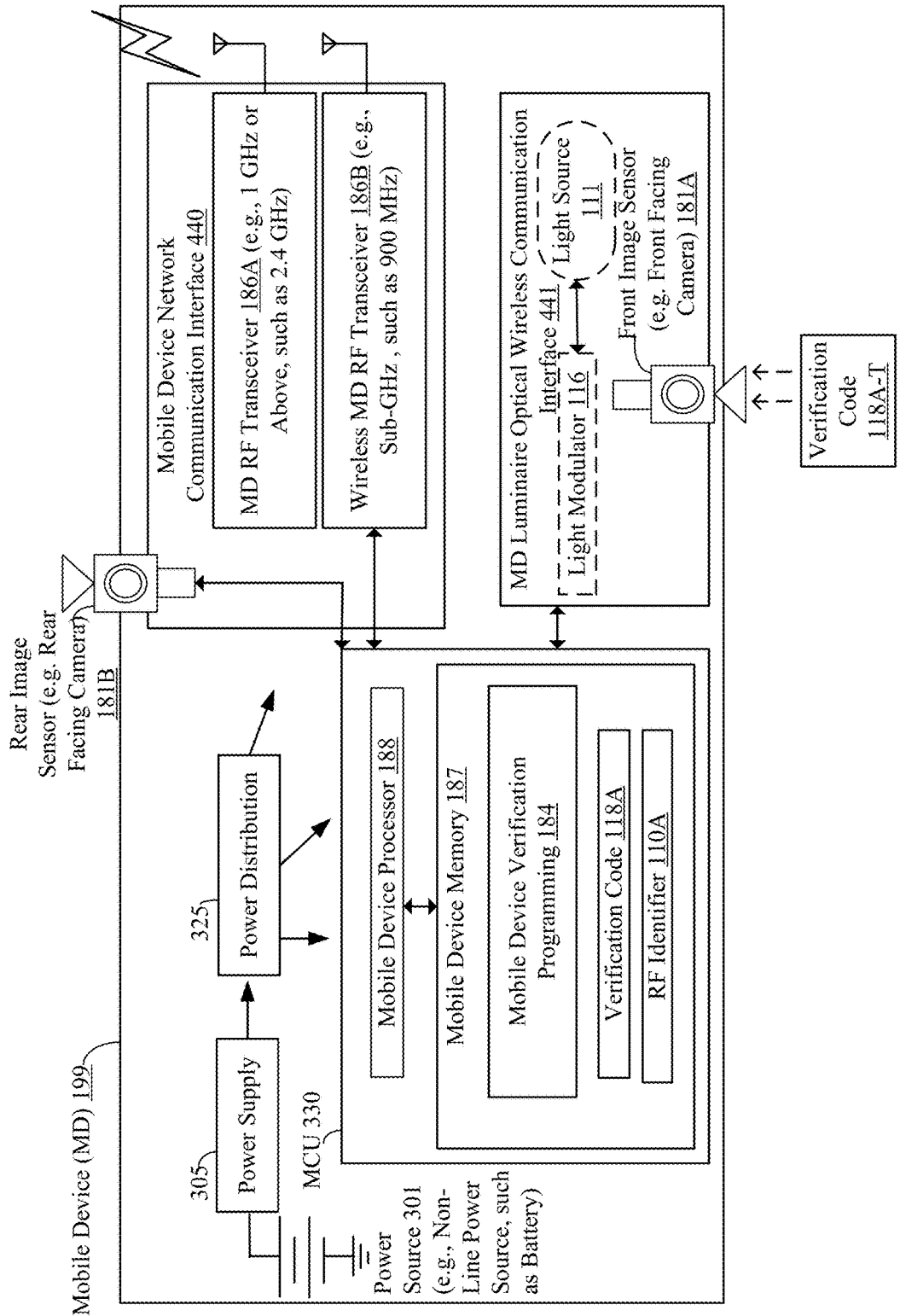
FIG. 4 is a block diagram of the mobile device to be verified and authorized by an RF node, for example, in the RF system of FIGS. 2A-D and lighting system of FIGS. 1A-D.

FIG. 4 is a block diagram of the mobile device 199 to be verified and authenticated, for example, in the RF system 200 of FIGS. 2A-D and lighting system 100 of FIGS. 1A-D. As shown, the mobile device 199 includes a power source (e.g., non-line power source, such as a battery), power supply 325, and MCU 330. MCU 330 includes the mobile device processor 188 and mobile device memory 187. The circuitry, hardware, and software of the mobile device 199 shown is similar to the luminaires 110A-T of FIG. 2. However, as shown, the mobile device memory 187 includes the mobile device verification programming 184.

Shown are elements of a touch screen type of mobile device 199, although other non-touch type mobile devices can be used in the luminaire-based positioning communications and controls under consideration here. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto.

Mobile device 199 includes a mobile device (MD) network communication interface 440, which is similar to the luminaire network communication interface 113.

The MD network communication interface 440 includes two wireless network communication interfaces 113A-B, shown as luminaire RF transceivers (XCVRs or radio) 113A-B. In our example, MD network communication interface 440 has a radio set that includes a first MD RF transceiver (e.g., radio) 186A configured for short-range wireless communication over a local wireless communication network 106, such as 1 GHz or above communications (e.g., 2.4 GHz for Bluetooth) for verification and authorization purposes. MD network communication interface 440 can further include a second MD RF transceiver (e.g., radio) 186B configured for wireless communication over: (a) a local area network (LAN) 106, 108 to the authentication server 120, or (b) a wide area network (WAN) 130 to the authentication server 120. For example, the second MD RF transceiver 186B is configured for wireless communication (e.g., unicast and multicast) via a wireless lighting control network, such as secondary LAN 108, over a wireless lighting control network communication band, such as sub-GHz (e.g., 900 MHz for WiFi) for lighting control and systems operations (or information) with authentication server 120, for example. Transport layer methods ride on the network layer function of the transceivers 186A-B. The second MD RF transceiver 186B is optional, for example, communication with the authentication server 120 can occur via the first CD RF transceiver 186A.

In addition to the MD network communication interface 440, the mobile device 199 includes a MD optical wireless communication interface 441. MD optical wireless communication interface 441 includes both a front image sensor (e.g., front facing camera 181A) and a rear image sensor (e.g., rear facing camera 181B). These image sensors, light cameras 181A-B, receive data over the light communication band 107.

MD optical wireless communication interface 441 receives the respective verification code 118A-T. MD optical wireless communication interface 441 can optionally include light source 111, driver circuit 112, and light modulator 116 to transmit data over the light communication band 107.

The mobile device memory 187 is used to store programming or instructions for execution by the mobile device processor 188. Depending on the type of device, the mobile device 199 stores and runs a mobile operating system through which specific applications, including a mobile device programming (which may be a web browser executing a dynamic web page), runs on mobile device 199. Examples of mobile operating systems include Google Android, Apple iOS (I-Phone or iPad devices), Windows Mobile, Amazon Fire OS, RIM BlackBerry operating system, or the like. Flash memory 940A may also be used to store mobile configuration settings for different mobile applications or services executable at mobile device 199 using processor 188.

FIG. 5 is a block diagram of an authentication server 120 that communicates via the lighting system 100 of FIGS. 1A-D and RF system 200 of FIGS. 2A-D. As shown in FIG. 5, the authentication server 120 includes an authentication server network communication interface system 521 including an authentication server local wireless network communication interface 522A configured for wireless communication over the secondary local area network (LAN) 108, which can be via wired or wireless (e.g., RF) communication. Alternatively or additionally, authentication local wireless network communication interface 522A can be for wireless communication over the local wireless communication network RF of the local wireless communication network 106, e.g., with the mobile device 199 and RF nodes 208A-W (e.g., LSEs 209A-W, such as luminaires 110A-T).

Authentication server memory 524 of FIG. 5, luminaire memory 114, and mobile device memory 187 each include memories/storage, such as a random access memory and/or a read-only memory to store data, as well as programs stored in one or more of the memories/storage.

Authentication server network communication interface system 121 further includes an authentication server WAN communication interface 522B for communication over the WAN 130 to the mobile device 199. Authentication server WAN communication interface 522B can be wired (e.g., Ethernet) or wireless, such as cellular data, for example. The authentication server 120 further includes an authentication server memory 524, an authentication server processor 523 coupled to the authentication server network communication interface system 521 and the authentication server memory 524.

As shown in FIG. 5, the authentication server memory 524 can, for example, store the luminaire node map 125 and LSE node map 225. Additionally, the authentication server memory 524 may store a plurality of authorization codes 550, such that a respective authorization code 551 is associated with a respective physical site 105. Further, the authentication server memory 524 may store a physical site database 552 that includes a plurality of physical site identifiers 105 and a plurality of network access schedules 553 such that a respective physical site identifier 105 is associated with respective access schedule 553 for the respective physical site 105. The respective physical site identifier 105 is associated with the respective authorization code 551. A network access schedule indicates which users 197 or mobile devices 199 can be authorized at the current time.

Authentication server memory 524 also stores authentication server programming 528. Execution of the authentication server programming 528 by the authentication server processor 523 configures the authentication server 120 to implement the following functions.

Authentication server 120 receives, via the authorization server network communication interface 521 over the local wireless communication network 106 or the secondary network 108, the respective digital verification code 118A from the mobile device 199. Authentication server 120 compares the respective verification code 118A received from the mobile device 199 to the plurality of authorization codes 550, and the authentication server 120 grants or denies the authentication approval to the mobile device 199 to control the plurality of RF nodes 110A-T, 208A-W over the local wireless communication network 106 based on the comparison of the respective verification code 118A transmitted by the mobile device 199 to the plurality of authorization codes 550. The function to compare the respective verification code 118A received from the mobile device 199 to the plurality of authorization codes 550 includes finding that the respective verification code 118A matches the respective authorization code 551. In response to finding the matching respective authorization code 551, the authorization server 120 retrieves the respective physical site network access schedule 553 associated with the respective physical site identifier 105. The authorization server 120 then compares the respective physical site network access schedule 553 to the current date and time. Based on the comparison of the respective physical site network access schedule 553 to the current date and time, the authorization server 120 grants or denies the authentication approval 178 to the mobile device 199 to control the plurality of RF nodes 110A-T, 208A-W over the local wireless communication network.

The authentication server 120 grants the authentication approval 178 to the mobile device 199 by transmitting, via the authentication server network communication interface 521 over the secondary network 108, an administrative authorization key or code 555 to control the plurality of RF nodes 110A-T, 208A-W via the local wireless communication network 106.

The authentication server 120 may also grant or deny the authorization approval 178 to the mobile device 199 to control the plurality of RF nodes 110A-T, 208A-W over the local wireless communication network 106 after the security challenge device 180 identifies the user 197 of the mobile device 199.

The authentication server 120 transmits, via the authentication server network communication interface 521 over the local wireless communication network 106, the initiation code 179 to the respective RF node 110A.

Figure 6:
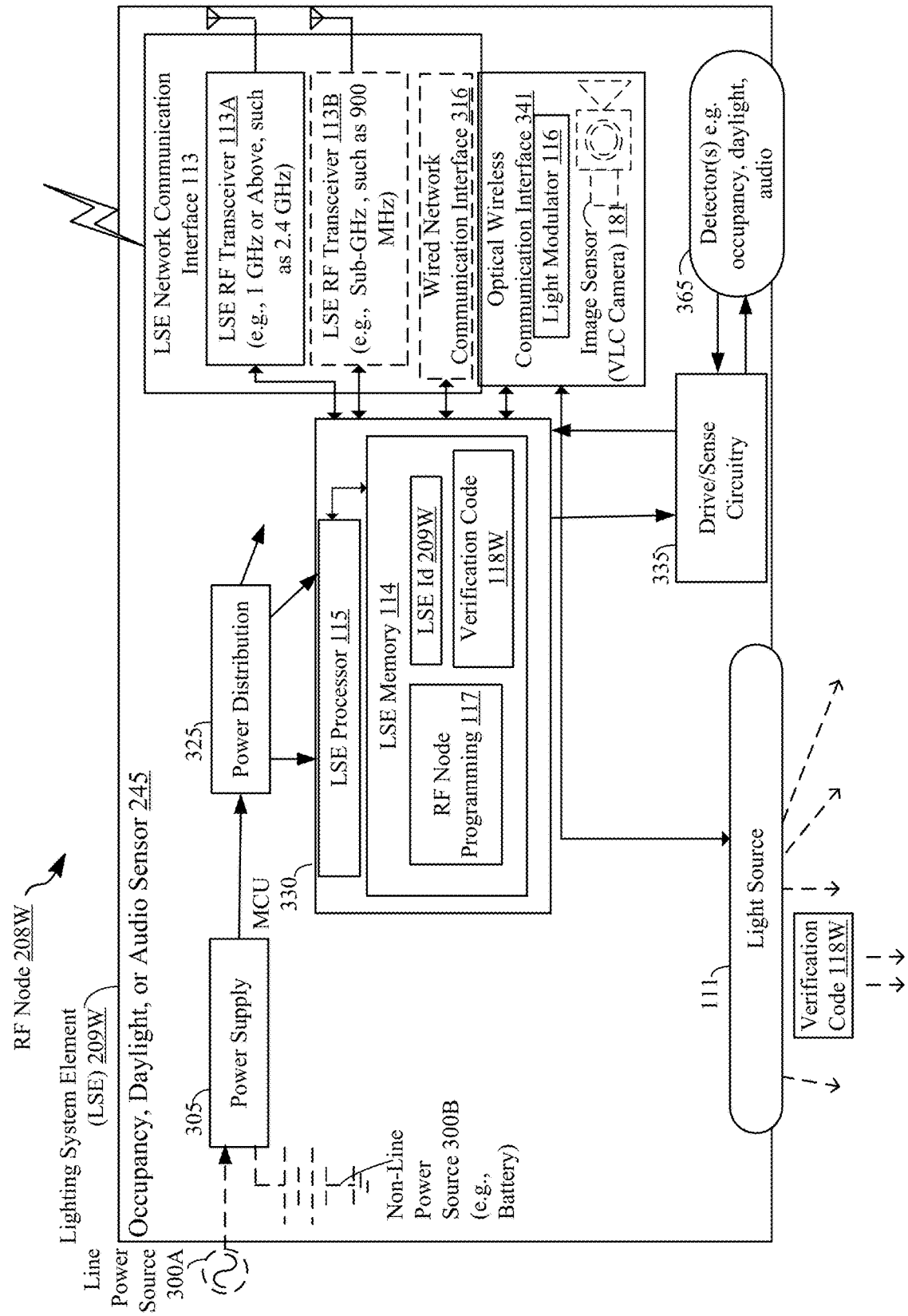
FIG. 6 is a block diagram of an RF node, more specifically an LSE, which is an occupancy, daylight, or audio sensor that is in the RF system of FIGS. 2A-D.

FIG. 6 is a block diagram of RF node 208W, more specifically LSE 209W, which is an occupancy, daylight, or audio sensor 245 that is in the RF system 200 of FIGS. 2A-D. The circuitry, hardware, and software of the occupancy, daylight, or audio sensor 245 shown is similar to the luminaires 110A-T of FIG. 3, including LSE network communication interface 113, optical wireless communication interface 341, and MCU 330 to implement the verification and authorization techniques, such as verification protocol 299, described herein. As shown, MCU 330 includes LSE memory 114 and LSE processor 115. LSE memory 114 includes RF node programming 117 for verification and authorization, and the depicted data of a respective LSE identifier (id) 209W and a respective verification code 118W.

Figure 7A:
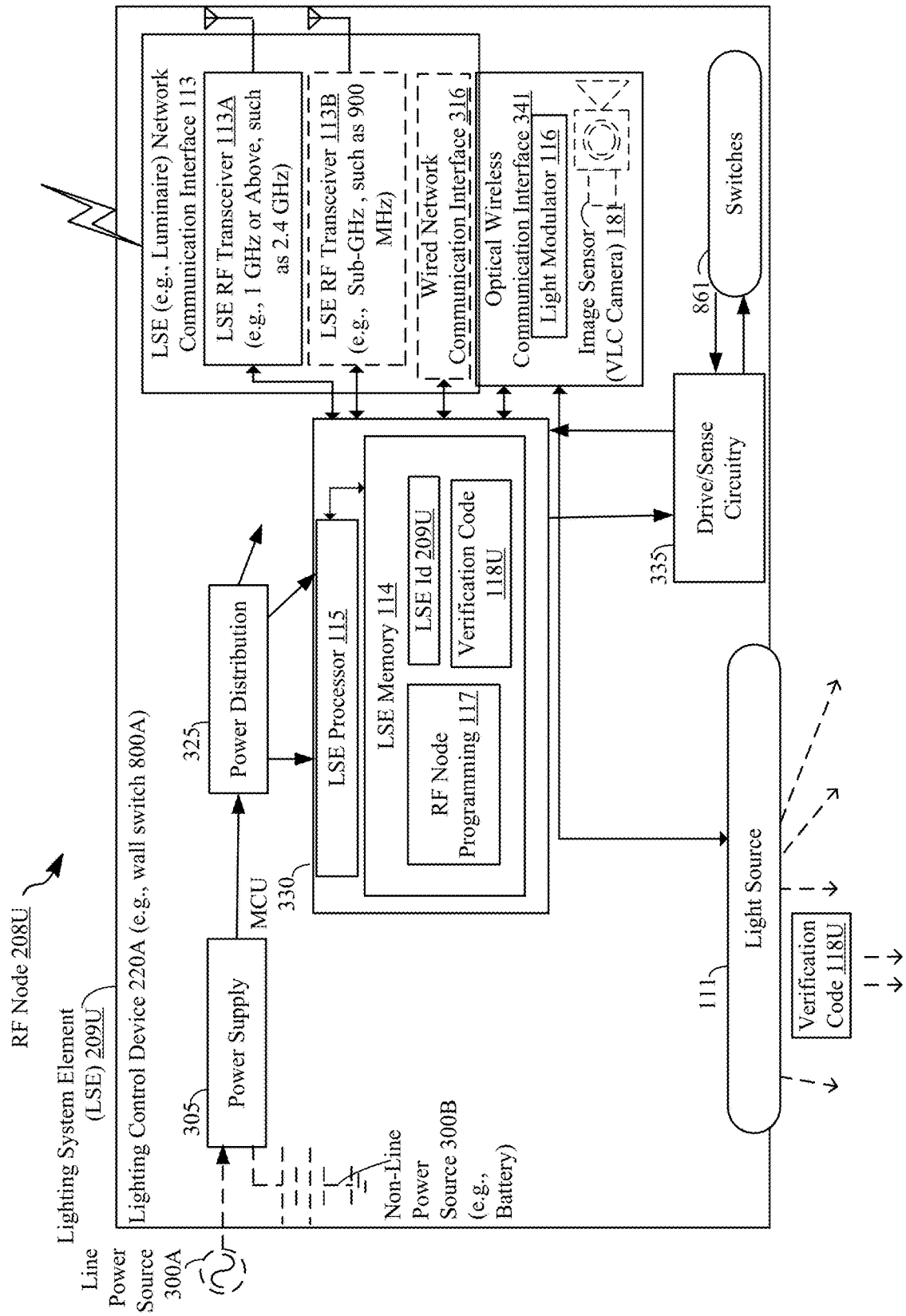
FIGS. 7A-B are block diagrams of RF nodes (e.g., lighting control devices), specifically a wall switch and a touch screen device that are in the RF system of FIGS. 2A-D.
Figure 7B:
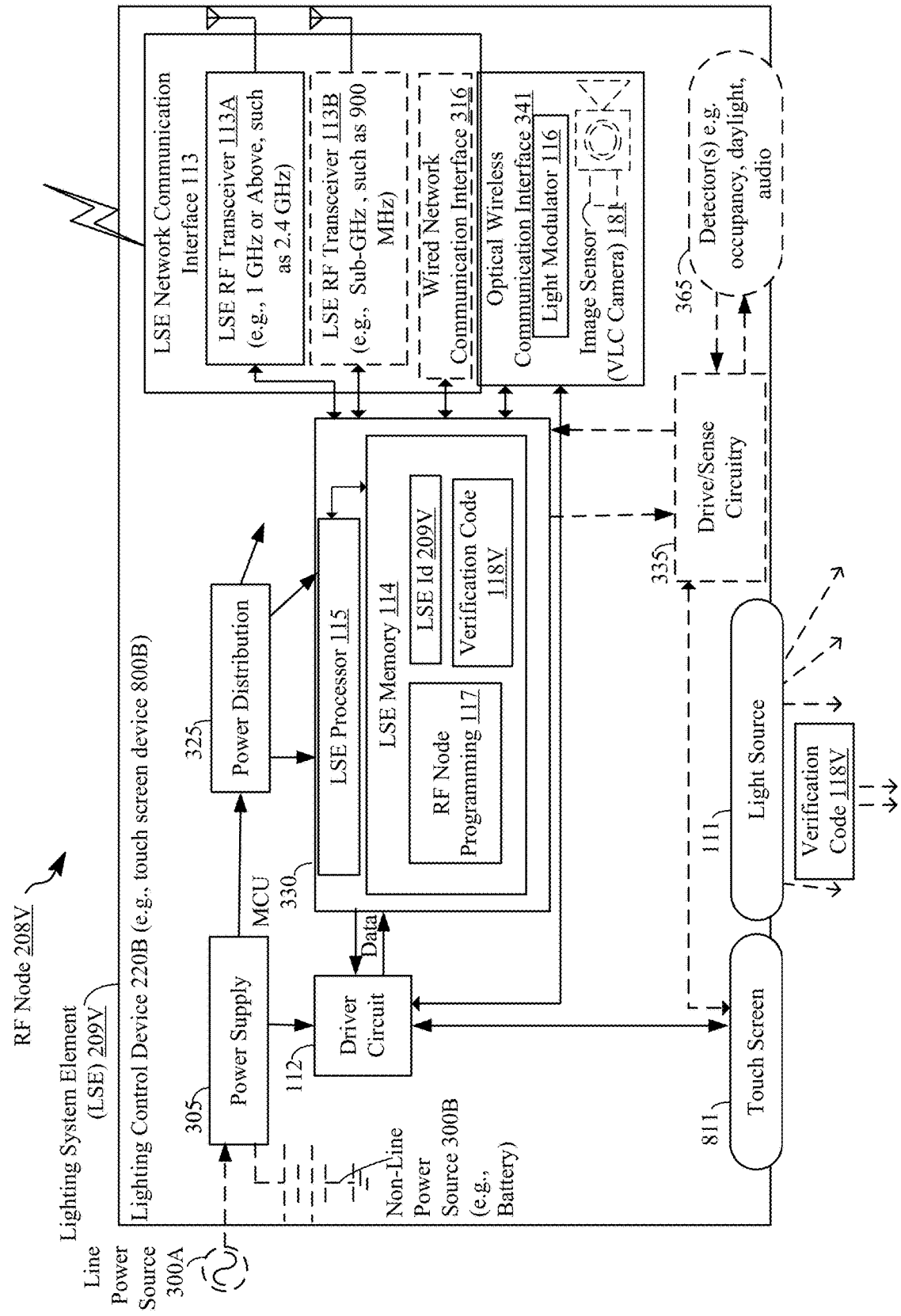

FIGS. 7A-B are block diagrams of RF nodes 208U-V (e.g., lighting control devices 209U-V), specifically a wall switch 800A and a touch screen device 800B that are in the RF system 200 of FIGS. 2A-D. The circuitry, hardware, and software of the LCDs 209U-V shown are similar to the luminaires 110A-T of FIG. 3, including LSE network communication interface 113, optical wireless communication interface 341, and MCU 330 to implement the verification and authorization techniques, such as verification protocol 299, described herein. As shown, MCU 330 includes LSE memory 114 and LSE processor 115. LSE memory 114 includes RF node programming 117 for verification and authorization, and the depicted data of a respective LSE identifier (id) 209U-V and a respective verification code 118U-V.

However, as shown, wall switch 800A and touchscreen device 800B can include a subset of the circuitry, hardware, and software shown for the luminaires 110A-T of FIG. 3. As shown in FIG. 8A, LCD 220A can be a wall switch 800A where the drive/sense circuitry 255 responds to switches 861. Switches 861 can be an on/off switch, dimmer switch, or set scene switch based on Acuity Brands Lighting's commercially available xPoint® Wireless ES7 product. In some examples, wall switch 800A includes a single shared button switch 861 for on/off, dimming, or set scene functions and a pilot light source indicator (not shown) of wall switch 800A. A button station can include various button settings that can have the lighting control settings adjusted, for example, four buttons can be arranged with two longitudinal buttons (north-south) and two lateral buttons (east-west).

In FIG. 8B, LCD 220B can be a touchscreen device 800B where lighting control setting adjustments are inputted via a user interface application (not shown) through manipulation or gestures on a touch screen 811. For output purposes, the touch screen 811 includes a display screen, such as a liquid crystal display (LCD) or light emitting diode (LED) screen or the like. For input purposes, touch screen 811 includes a plurality of touch sensors.

A keypad may be implemented in hardware as a physical keyboard of touch screen device 800B, and keys may correspond to hardware keys of such a keyboard. Alternatively, some or all of the keys (and keyboard) of touchscreen device 800B may be implemented as "soft keys" of a virtual keyboard graphically represented in an appropriate arrangement via touch screen 811. The soft keys presented on the touch screen 811 may allow the user of touchscreen device 800B to invoke the same user interface functions as with the physical hardware keys.

Optionally drive/sense circuitry 335 is coupled to touch sensors of touch screen 811 for detecting the occurrence and relative location/position of each touch with respect to a content display area of touch screen 811. In this example, drive/sense circuitry 335 is configured to provide LSE processor 115 with touch-position information based on user input received via touch sensors. In some implementations, LSE processor 115 is configured to correlate the touch position information to specific content being displayed within the content display area on touch screen 811. The touch-position information captured by the drive/sense circuitry 335 and provided to LSE processor 115 may include, but is not limited to, coordinates identifying the location of each detected touch with respect to the display area of touch screen 811 and a timestamp corresponding to each detected touch position.

In general, touch screen 811 and its touch sensors (and one or more keys, if included) are used to provide a textual and graphical user interface for the touchscreen device 800B. In an example, touch screen 811 provides viewable content to the user at lighting control device 220B. Touchscreen device 800B also enables the user to interact directly with the viewable content provided in the content display area, typically by touching the surface of the screen with a finger or an implement such as a stylus.

The wall switch 800A or touch screen device 800B are capable of acting as the security challenge device 180.

Any of the steps or functionality, e.g., of RF node verification and authorization techniques, such as verification protocol 299, described herein for RF nodes 208A-W (e.g., LSEs 209A-W, e.g., luminaires 110A-T; LCDs 220A-B; and occupancy, daylight or audio sensor 245), mobile device 199, and authentication server 120 can be embodied in programming or one more applications as described previously. This includes, for example, RF node programming 117 and mobile device verification programming 184. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++), procedural programming languages (e.g., C or assembly language), or firmware. In a specific example, a third party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating systems. In this example, the third party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A wireless control authorization system, comprising:
   a plurality of radio frequency (RF) nodes located within a respective physical site of a plurality of physical sites, wherein a respective RF node includes:
      an RF node network communication interface configured for RF communication over a local wireless communication network;
      an optical wireless communication interface, including:
         a light source to emit light, and
         a light modulator coupled to the light source to modulate the emitted light from the light source for light communication over a light communication band;
      an RF node processor coupled to control the optical wireless communication interface and coupled to communicate via the RF node network communication interface;
      an RF node memory coupled to the RF node processor and including a respective verification code associated with the respective physical site, wherein the respective verification code verifies a physical location of the mobile device is within the respective physical site and within a short range of the respective RF node; and
      RF node programming in the RF node memory, wherein execution of the RF node programming by the RF node processor of the respective RF node configures the respective RF node to implement functions, including functions to:
         control the light source via the light modulator, to modulate the emitted light to transmit over the light communication band the respective physical site verification code;
   a mobile device, comprising:
      a mobile device network communication interface, configured for wireless communication over the local wireless communication network, a secondary network, or both the local wireless communication network and the secondary network;
      an image sensor, configured to receive the light communication over the light communication band;
      a mobile device processor coupled to control the image sensor and coupled to communicate via the mobile device network communication interface;
      a mobile device memory coupled to the device processor; and
      mobile device verification programming in the device memory, wherein execution of the mobile device verification programming by the device processor of the mobile device configures the mobile device to implement functions, including functions to:
         log in to an authorization server, via the mobile device network communication interface, over the secondary network;
         receive, via the image sensor, over the light communication band, the respective verification code;
         in response to logging in to the authorization server and receiving the respective verification code, transmit, via the mobile device network communication interface over the secondary network, the respective verification code to the authorization server;
         in response to transmitting the respective verification code to the authorization server, obtain, via the mobile device network communication interface over the secondary network, an authentication approval to control the plurality of RF nodes over the local wireless communication network.

2. The wireless control authorization system of claim 1, wherein:
   the plurality of RF nodes includes a plurality of luminaires;
   the function to log in to the authorization server includes to enter: (i) a password, or (ii) both a username and the password to obtain access to the authorization server;
   the function to obtain the authentication approval includes to receive, via the mobile device network communication interface over the secondary network, an authorization key or code to control the plurality of luminaires via the local wireless communication network; and
   the authorization key or code is valid for a fixed time window.

3. The wireless control authorization system of claim 1, wherein:
   the authorization server includes:
      an authorization server network communication interface, configured for wireless communication over the local wireless communication network, a secondary network, or both the local wireless communication network and the secondary network;
      an authorization server processor coupled to communicate via the authorization server network communication interface;
      an authorization server memory coupled to the authorization server processor; and
      authorization server programming in the authorization server memory, wherein execution of the authorization server programming by the authorization server processor of the authorization server configures the authorization server to implement functions, including functions to:
         receive, via the authorization server network communication interface over the local wireless communication network or the secondary network, the respective digital verification code from the mobile device.

4. The wireless control authorization system of claim 3, wherein:

the secondary network is a wide area network (WAN);
the authorization server network communication interface is configured to communicate with the mobile device over the WAN.

5. The wireless control authorization system of claim 3, wherein:
the authorization server memory includes:
a plurality of authorization codes for the plurality of physical sites, such that a respective authorization code is associated with the respective physical site,
a physical site database that includes a plurality of physical site identifiers and a plurality of network access schedules such that a respective physical site identifier is associated with a respective access schedule for the respective physical site,
the respective physical site identifier being associated with the respective authorization code; and
authorization server programming in the authorization memory,
execution of the authorization server programming by the authorization processor of the authorization server further configures the authorization server to implement functions, including functions to:
compare the respective verification code received from the mobile device to the plurality of authorization codes; and
grant or deny the authentication approval to the mobile device to control the plurality of RF nodes over the local wireless communication network based on the comparison of the respective verification code transmitted by the mobile device to the plurality of authorization codes.

6. The wireless control authorization system of claim 5, wherein:
execution of the authorization server programming by the authorization server processor of the authorization server further configures the authorization server to implement functions, including functions to:
the function to compare the respective verification code received from the mobile device to the plurality of authorization codes includes finding that the respective verification code matches the respective authorization code;
in response to finding the matching respective authorization code, retrieve the respective physical site network access schedule associated with the respective physical site identifier;
compare the respective physical site network access schedule to a current date and time; and
based on the comparison of the respective physical site network access schedule to a current date and time, grant or deny the authentication approval to the mobile device to control the plurality of RF nodes over the local wireless communication network.

7. The wireless control authorization system of claim 6, wherein:
execution of the authorization server programming by the authorization server processor of the authorization server further configures the authorization server to implement functions, including functions to:
grant the authentication approval to the mobile device by transmitting, via the authentication server network communication interface over the secondary network, an administrative authorization key or code to control the plurality of RF nodes via the local wireless communication network; and execution of the mobile device verification programming by the mobile device processor of the mobile device configures the mobile device to implement functions, including functions to:
in response to being granted authentication approval to control the plurality of RF nodes over the local wireless communication network based on the comparison, instruct the respective RF node to enter into a diagnostics, maintenance, or administrative mode; and
issue control commands for diagnostics, maintenance, or administration to the respective RF node, via the mobile device network communication interface over the local wireless communication network.

8. The wireless control authorization system of claim 3, wherein:
the respective physical site includes a secure room that houses a security challenge device configured to verify an identify of a user of the mobile device; and
execution of the authorization server programming by the authorization server processor of the authorization server further configures the authorization server to implement functions, including functions to:
grant or deny the authorization approval to the mobile device to control the plurality of RF nodes over the local wireless communication network after the security challenge device identifies the user of the mobile device.

9. The wireless control authorization system of claim 3, wherein the mobile device further comprises:
mobile device verification programming in the mobile device memory, wherein execution of the mobile device verification programming by the mobile device processor of the mobile device further configures the mobile device to implement functions, including functions to:
transmit, via the mobile device network communication interface over the secondary network, an initiation code to the authorization server;
execution of the authorization server programming by the authorization server processor of the authorization server further configures the authorization server to implement functions, including functions to:
transmit, via the authorization server network communication interface over the local wireless communication network, the initiation code to the respective RF node; and
execution of the RF node programming by the RF node processor of the respective RF node further configures the respective RF node to implement functions, including functions to:
control the light source, via the light modulator, to modulate the emitted light to transmit over the light communication band the respective physical site verification code after receiving the initiation code from the authentication server.

10. The wireless control authorization system of claim 1, wherein:
the plurality of RF nodes include: (i) a luminaire, and (ii) a lighting control device, or (iii) an occupancy, daylight, or audio sensor; and
the local wireless communication network is configured to transmit a light source operation command from the lighting control device or the occupancy, daylight, or audio sensor to the luminaire to control an artificial illumination lighting of the luminaire.

11. The wireless control authorization system of claim 1, wherein:
the light communication band is an infrared light communication band.

12. The wireless control authorization system of claim 1, wherein:
the respective verification code includes a randomly generated code for the respective physical site or a visible light communication (VLC) identifier of the respective RF node.

13. The wireless control authorization system of claim 12, wherein:
the respective RF node is the luminaire;
the respective RF node is ceiling-mounted;
the light communication band is a visible light communication (VLC) band; and
the light modulator is coupled to the light source to modulate the emitted light from the light source for light communication over a light communication band;
the respective RF node includes:
the light source,
a driver circuit coupled to the light source to control light source operation of the light source, and
a power supply driven by a line power source; and
the RF node network communication interface of the respective RF node receives the light source operation command over the local wireless communication network.

14. The wireless control authorization system of claim 1, wherein:
the respective physical site verification code comprises two or more sub-codes;
a first sub-code of the physical site verification code verifies a first physical location of the mobile device is within the respective physical site and within a short range of the respective RF node;
execution of the RF node programming by the RF node processor of the confirmation RF node configures the confirmation RF node to implement functions, including functions to:
control the light source via the light modulator, to modulate the emitted light to transmit over the light communication band the first sub-code; and
a confirmation RF node of the plurality of RF nodes includes:
a confirmation RF node network communication interface configured for a RF communication over the local wireless communication network;
a confirmation optical wireless communication interface, including:
a confirmation light source to emit light, and
a confirmation light modulator coupled to the confirmation light source to modulate the emitted light from the confirmation light source for light communication over a light communication band;
a confirmation RF node processor coupled to control the confirmation optical wireless communication interface and coupled to communicate via the confirmation RF node network communication interface;
a confirmation RF node memory coupled to the confirmation RF node processor and including a second sub-code of the physical site verification code, wherein the second sub-code verifies a second physical location of the mobile device is within the respective physical site and within a short range of the confirmation RF node; and RF node programming in the confirmation RF node memory, wherein execution of the RF node programming by the confirmation RF node processor of the confirmation RF node configures the confirmation RF node to implement functions, including functions to:
control the confirmation light source via the confirmation light modulator, to modulate the emitted light to transmit over the light communication band the second sub-code.

15. The wireless control authorization system of claim 14, wherein:
the mobile device is either within the short range of the respective RF node, or the mobile device is within the short range of the confirmation RF node, or the mobile device is outside the short range of the respective RF node as well as outside the short range of the confirmation RF node.

16. A wireless control authorization system, comprising:
a plurality of radio frequency (RF) nodes located within a respective physical site of a plurality of physical sites, wherein a respective RF node includes:
an RF node network communication interface configured for RF communication over a local wireless communication network;
a short range wireless communication interface, for wireless communication over: (i) a visible light communication band, (ii) an infrared light communication band, or (iii) an ultrasonic communication band;
an RF node processor coupled to control the short range wireless communication interface and coupled to communicate via the RF node network communication interface;
an RF node memory coupled to the RF node processor and including a respective verification code associated with the respective physical site, wherein the respective verification code verifies a physical location of the mobile device is within the respective physical site and within a short range of the respective node; and
RF node programming in the node memory, wherein execution of the RF node programming by the RF node processor of the respective RF node configures the respective RF node to implement functions, including functions to:
control the short range wireless communication interface, to wirelessly transmit over the visible light communication band, the infrared light communication band, or the ultrasonic communication band, the respective physical site verification code;
a mobile device, comprising:
a mobile device network communication interface, configured for wireless communication over the local wireless communication network, a secondary network, or both the local wireless communication network and the secondary network;
a mobile device wireless communication sensor, configured to receive the visible light communication over the visible light communication band, infrared light communication over the infrared light communication band, or ultrasonic communication over the ultrasonic communication band from the short range wireless communication interface;
a mobile device processor coupled to control the mobile device wireless communication sensor and coupled to communicate via the mobile device network communication interface;
a mobile device memory coupled to the mobile device processor; and
mobile device verification programming in the device memory, wherein execution of the mobile device verification programming by the device processor of the mobile device configures the mobile device to implement functions, including functions to:
log in to an authorization server, via the mobile device network communication interface, over the secondary network;
receive, via the mobile device wireless communication sensor, from the short range wireless communication interface, the respective verification code;
in response to logging in to the authorization server and receiving the respective verification code, transmit, via the mobile device network communication interface over the secondary network, the respective verification code to the authorization server;
in response to transmitting the respective verification code to the authorization server, obtain, via the mobile device network communication interface over the secondary network, an authentication approval to control the plurality of RF nodes over the local wireless communication network.

17. The wireless control authorization system of claim 16, wherein:
the plurality of RF nodes includes a plurality of luminaires;
the function to log in to the authorization server includes to enter: (i) a password, or (ii) both a username and the password to obtain access to the authorization server;
the function to obtain the authentication approval includes to receive, via the mobile device network communication interface over the secondary network, an authorization key or code to control the plurality of luminaires via the local wireless communication network; and
the authorization key or code is valid for a fixed time window.

18. The wireless control authorization system of claim 16, wherein:
the authorization server includes:
an authorization server network communication interface, configured for wireless communication over the local wireless communication network, a secondary network, or both the local wireless communication network and the secondary network;
an authorization server processor coupled to communicate via the authorization server network communication interface;
an authorization server memory coupled to the authorization server processor; and
authorization server programming in the authorization server memory, wherein execution of the authorization server programming by the authorization server processor of the authorization server configures the authorization server to implement functions, including functions to:
receive, via the authorization server network communication interface over the local wireless communication network or the secondary network, the respective digital verification code from the mobile device.

19. The wireless control authorization system of claim 18, wherein:
the secondary network is a wide area network (WAN); and
the authorization server network communication interface is configured to communicate with the mobile device over the WAN.

20. The wireless control authorization system of claim 19, wherein:
the authorization server memory includes:
a plurality of authorization codes for the plurality of physical sites, such that a respective authorization code is associated with the respective physical site,
a physical site database that includes a plurality of physical site identifiers and a plurality of network access schedules such that a respective physical site identifier is associated with a respective access schedule for the respective physical site,
the respective physical site identifier being associated with the respective authorization code; and
authorization server programming in the authorization memory,
execution of the authorization server programming by the authorization processor of the authorization server further configures the authorization server to implement functions, including functions to:
compare the respective verification code received from the mobile device to the plurality of authorization codes; and
grant or deny the authentication approval to the mobile device to control the plurality of RF nodes over the local wireless communication network based on the comparison of the respective verification code transmitted by the mobile device to the plurality of authorization codes.

* * * * *